(12) United States Patent
Kobayashi et al.

(10) Patent No.: US 10,040,193 B2
(45) Date of Patent: Aug. 7, 2018

(54) MOTOR CONTROL SYSTEM, ROBOT SYSTEM, AND COMMUNICATION METHOD FOR MOTOR CONTROL SYSTEM

(71) Applicant: Kabushiki Kaisha Yaskawa Denki, Kitakyushu-shi (JP)

(72) Inventors: Kazutoshi Kobayashi, Kitakyushu (JP); Takuya Miwa, Kitakyushu (JP); Mamoru Fukuda, Kitakyushu (JP); Yoshitaka Kashiwagi, Kitakyushu (JP); Hidetsugu Koga, Kitakyushu (JP); Kazuhiro Imanaga, Kitakyushu (JP); Tadashi Okubo, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/443,181

(22) Filed: Feb. 27, 2017

(65) Prior Publication Data

US 2017/0246741 A1    Aug. 31, 2017

(30) Foreign Application Priority Data

Feb. 29, 2016 (JP) ................... 2016-037490
Mar. 18, 2016 (JP) ................... 2016-055616

(51) Int. Cl.
*G05B 19/19* (2006.01)
*B25J 9/12* (2006.01)
(Continued)

(52) U.S. Cl.
CPC ............ *B25J 9/126* (2013.01); *G05B 19/041* (2013.01); *G05B 19/0428* (2013.01); *G05B 2219/37285* (2013.01)

(58) Field of Classification Search
CPC .. B25J 19/126; G05B 19/041; G05B 19/0428; G05B 2219/37285
(Continued)

(56) References Cited

U.S. PATENT DOCUMENTS 4,124,889 A * 11/1978 Kaufman ................ G06F 11/10
                                                                 700/3
5,317,501 A *  5/1994 Hilpert ............... G05B 19/4145
                                                                 700/3
(Continued)

FOREIGN PATENT DOCUMENTS

EP     2 672 346 A1   12/2013
EP     2 755 357 A1    7/2014
(Continued)

OTHER PUBLICATIONS

Partial European Search Report dated Jul. 7, 2017 in Patent Application No. 17157556.6.
(Continued)

*Primary Examiner* — Karen Masih
(74) *Attorney, Agent, or Firm* — Oblon, McClelland, Maier & Neustadt, L.L.P.

(57) ABSTRACT

A motor control system includes first processing circuitry that controls a motor. An upper-level communication path connects an upper-level communication port of the first processing circuitry to second processing circuitry that sends an instruction to the first processing circuitry via the upper-level communication path. A lower-level communication path connects a lower-level communication port of the first processing circuitry to a plurality of devices connected in series to each other. The devices include rotational angle detection circuitry and output circuitry. The rotational angle detection circuitry detects a rotation angle of the motor. The output circuitry outputs associated information that is associated with the motor and is different from the rotational (Continued)

angle or that is associated with an industrial device associated with the motor. The first processing circuitry performs a predetermined processing based on the rotational angle and the associated information, and sends a result of the predetermined processing to the second processing circuitry.

20 Claims, 27 Drawing Sheets

(51) Int. Cl.
  *G05B 19/04* (2006.01)
  *G05B 19/042* (2006.01)
(58) Field of Classification Search
  USPC ..................................................... 318/568.11
  See application file for complete search history.

(56) References Cited

U.S. PATENT DOCUMENTS

| | | | | |
|---|---|---|---|---|
| 5,831,848 | A * | 11/1998 | Rielly | G05B 19/0421 |
| | | | | 370/402 |
| 5,886,894 | A * | 3/1999 | Rakoff | G05B 19/0421 |
| | | | | 700/3 |
| 6,359,970 | B1 * | 3/2002 | Burgess | H04L 47/10 |
| | | | | 379/142.01 |
| 6,587,474 | B1 * | 7/2003 | Griessbach | B60R 16/0315 |
| | | | | 370/446 |
| 6,597,956 | B1 * | 7/2003 | Aziz | G06F 9/45504 |
| | | | | 700/101 |
| 6,823,219 | B2 * | 11/2004 | Lee | G05B 15/02 |
| | | | | 340/855.4 |
| 9,308,647 | B2 * | 4/2016 | Linnell | B25J 9/1671 |
| 9,459,607 | B2 * | 10/2016 | Frazer | G05B 15/02 |
| 9,494,926 | B2 * | 11/2016 | Frazer | G05B 15/02 |
| 9,639,077 | B2 * | 5/2017 | Mizutani | G05B 19/04 |
| 2012/0179849 | A1 * | 7/2012 | Mizutani | G05B 19/054 |
| | | | | 710/110 |
| 2014/0005835 | A1 * | 1/2014 | Nishiyama | G05B 19/056 |
| | | | | 700/275 |
| 2014/0200684 | A1 | 7/2014 | Mizutani | |
| 2017/0007336 | A1 * | 1/2017 | Tsuboi | B25J 9/1674 |

FOREIGN PATENT DOCUMENTS

| | | |
|---|---|---|
| JP | 08-241111 A | 9/1996 |
| JP | 10-105206 A | 4/1998 |
| WO | WO 2015/137038 A1 | 9/2015 |

OTHER PUBLICATIONS

Extended European Search Report dated Oct. 13, 2017 in Patent Application No. 17157556.6, 14 pages.

* cited by examiner

FIG. 23

| L | A | DT2 | CRC |

MOTOR CONTROL SYSTEM, ROBOT SYSTEM, AND COMMUNICATION METHOD FOR MOTOR CONTROL SYSTEM

CROSS-REFERENCE TO RELATED APPLICATIONS

The present application claims priority under 35 U.S.C. § 119 to Japanese Patent Application Nos. 2016-037490, filed Feb. 29, 2016, and 2016-055616, filed Mar. 18, 2016. The contents of this application are incorporated herein by reference in their entirety.

BACKGROUND

Field of the Invention

The present invention relates to a motor control system, a robot system, and a communication method for the motor control system.

Discussion of the Background

Japanese Unexamined Patent Application Publication No. 8-241111 discloses a system that includes an interface, a plurality of sensors, an upper-level controller, and a motor controller. The plurality of sensors are each connected to the interface through each's own unique communication path. The upper-level controller and the motor controller are connected to each other through a network. The plurality of sensors output detection signals to the upper-level controller and the motor controller through the network. Japanese Unexamined Patent Application Publication No. 10-105206 discloses a system that includes a motor controller. The motor controller includes a communication unit in the motor controller. Through the communication unit, the system is connected with a peripheral unit with which parameters of the motor controller are set or monitored.

SUMMARY

According to one aspect of the present disclosure, a motor control system includes first processing circuitry that controls a motor, an upper-level communication path connecting an upper-level communication port of the first processing circuitry to second processing circuitry, the second processing circuitry that sends an instruction to the first processing circuitry via the upper-level communication path, and a lower-level communication path connecting a lower-level communication port of the first processing circuitry to multiple devices connected in series to each other. The devices include rotational angle detection circuitry that detects a rotational angle of the motor, and output circuitry that outputs one or more pieces of associated information among a first piece of associated information and a second piece of associated information, the first piece of associated information being associated with the motor and being different from the rotational angle of the motor, the second piece of associated information being associated with an industrial device associated with the motor. The first processing circuitry further performs predetermined processing based on the rotational angle and the piece of associated information received via the lower-level communication path, and sends a result of the predetermined processing to the second processing circuitry via the upper-level communication path.

According to another aspect of the present disclosure, a robot system includes a motor control system including first processing circuitry that controls a motor, an upper-level communication path connecting an upper-level communication port of the first processing circuitry to second processing circuitry, the second processing circuitry that sends an instruction to the first processing circuitry via the upper-level communication path, and a lower-level communication path connecting a lower-level communication port of the first processing circuitry to multiple devices connected in series to each other. The devices include rotational angle detection circuitry that detects a rotational angle of the motor, and output circuitry that outputs one or more pieces of associated information among a first piece of associated information and a second piece of associated information, the first piece of associated information being associated with the motor and being different from the rotational angle of the motor, the second piece of associated information being associated with an industrial device associated with the motor, The first processing circuitry further performs predetermined processing based on the rotational angle and the at least one piece of associated information received via the lower-level communication path, and sends a result of the predetermined processing to the second processing circuitry via the upper-level communication path. The robot system includes a robot.

According to another aspect of the present disclosure, a communication method for a motor control system includes implementing, via an upper-level communication path, communication between an upper-level communication port of first processing circuitry that controls a motor and second processing circuitry that sends an instruction to the first processing circuitry via the upper-level communication path, implementing, via a lower-level communication path connecting multiple devices in series to each other, communication between the devices, the devices including rotational angle detection circuitry that is connected to a lower-level communication port and that detects a rotational angle of the motor, and output circuitry that outputs one or more pieces of associated information among a first piece of associated information and a second piece of associated information, the first piece of associated information being associated with the motor and being different from the rotational angle of the motor, the second piece of associated information being associated with an industrial device associated with the motor, and causing the first processing circuitry to perform a predetermined processing based on the rotational angle and the piece of associated information received via the lower-level communication path and to send a result of the predetermined processing to the second processing circuitry via the upper-level communication path.

According to the other aspect of the present disclosure, a motor control system includes first processing circuitry that controls a motor, an upper-level communication path connecting the first processing circuitry to second processing circuitry, the second processing circuitry that sends an instruction to the first processing circuitry via the upper-level communication path, and a lower-level communication path connecting a lower-level communication port of the first processing circuitry to multiple devices connected in series to each other. The devices include rotational angle detection circuitry that detects a rotational angle of the motor, and output circuitry that outputs one or more pieces of associated information among a first piece of associated information and a second piece of associated information, the first piece of associated information being associated with the motor and being different from the rotational angle of the motor, the second piece of associated information being associated with an industrial device associated with the motor, and the first processing circuitry further reduces a load associated with the second processing circuitry based on the rotational angle and the piece of associated information obtained via the lower-level communication path.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 23 illustrates an exemplary data format of a response according to embodiment 5;

DESCRIPTION OF THE EMBODIMENTS

1. Embodiment 1

According to the inventors' knowledge and experience, sensing of how a motor control system is operating has been becoming increasingly significant in recent years. One possible way to address to this situation is to increase the number of sensors. Increasing the number of sensors, however, increases the number of wires and other physical costs and/or increases communication traffic volume, processing load, and other processing costs. In particular, real-time sensing more likely increases physical costs and/or processing costs. As a result of studies conducted by the inventors in an attempt to minimize physical costs and/or processing costs involved in motor control systems, the inventors conceived of a novel and unique motor control system and associated apparatuses and/or devices. The motor control system and associated apparatuses and/or devices according to this embodiment will be described in detail below.

Figure 1:
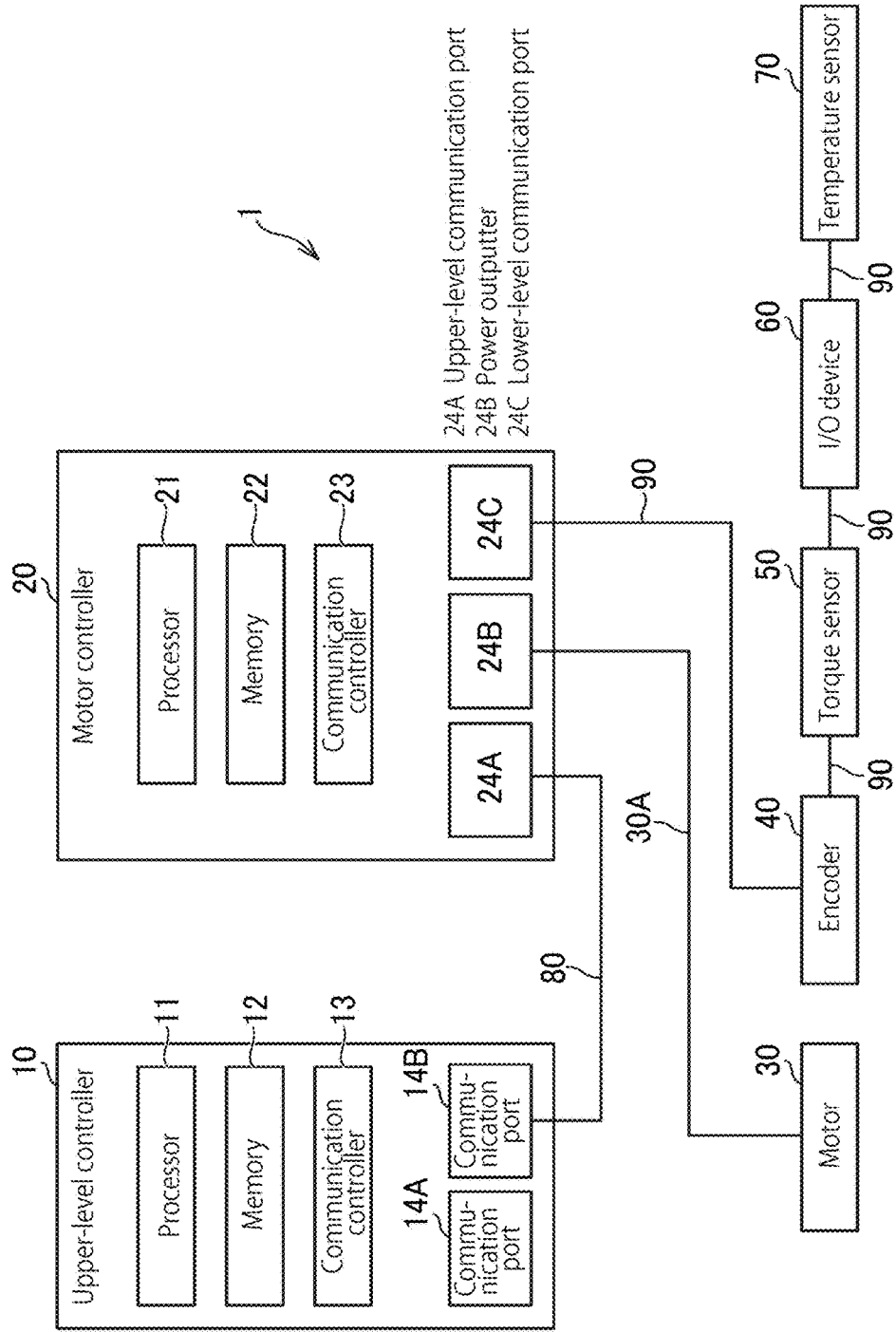
FIG. 1 is a diagram illustrating a general arrangement of a motor control system according to embodiment 1.

FIG. 1 is a diagram illustrating a general arrangement of a motor control system 1 according to embodiment 1. As illustrated in FIG. 1, the motor control system 1 includes an upper-level controller 10, a motor controller 20, a motor 30, an encoder 40, a torque sensor 50, an input-output (I/O) device 60, a temperature sensor 70, an upper-level communication path 80, and a lower-level communication path 90.

The upper-level controller 10 is a computer that controls overall operation of the motor control system 1. For example, the upper-level controller 10 sends an instruction to the motor controller 20 at a predetermined timing, or receives data from the motor controller 20. The upper-level controller 10 includes a processor 11, a memory 12, a communication controller 13, and communication ports 14A and 14B.

The processor 11 is a control-purpose integrated circuit. Examples of the processor 11 include, but are not limited to, a CPU and a micro-controller. The processor 11 may include a work-purpose RAM, not illustrated. The memory 12 is a typical, nonvolatile information storage medium. Examples of the memory 12 include, but are not limited to, a ROM, an EEPROM, a flash memory, and a hard disc. The memory 12 stores programs and various kinds of data.

The communication controller 13 is a typical communication-purpose integrated circuit. For example, the communication controller 13 may be implemented by a dedicated integrated circuit such as an Application Specific Integrated Circuit (ASIC). The communication port 14A is a communication interface for an external network such as the Internet. The communication port 14B is a communication interface for communication with the motor controller 20.

The motor controller 20 is a computer that controls an amplifier that outputs current, voltage, and/or another quantity to the motor 30. Generally, when the motor controller 20 is for the purpose of controlling a servo motor, the motor controller 20 is referred to as a servo controller or a servo amplifier. The motor controller 20 may be any other device that is capable of controlling a motor. For example, the motor controller 20 may be an inverter. The motor controller 20 includes a processor 21, a memory 22, a communication controller 23, an upper-level communication port 24A, a power outputter 24B, and a lower-level communication port 24C.

The processor 21, the memory 22, and the communication controller 23 may be similar in hardware configuration to the processor 11, the memory 12, and the communication controller 13, respectively. The upper-level communication port 24A is a communication interface for the upper-level communication path 80. The power outputter 24B outputs power to the motor 30 through a power source line 30A. The lower-level communication port 24C is a communication interface for the lower-level communication path 90.

In the motor controller 20, the processor 21, the memory 22, and the communication controller 23 each may have a duplicate configuration. In this case, one of the duplicate configuration may be used for communication control and sensor analysis, and the other one of the duplicate configuration may be used for motor control. Alternatively, no particular usage may be assigned to both duplicates. While in FIG. 1 a single motor 30 is provided, a plurality of motors 30 may be connected to the motor controller 20 so that the single motor controller 20 controls the plurality of motors 30.

The encoder 40 is a rotational angle detector that detects the rotational angle of the motor 30. Examples of the encoder 40 include, but are not limited to, an optical encoder and a magnetic encoder. By voltage or current applied from the motor controller 20, the motor 30 is turned into rotation. The encoder 40 sends the rotational angle of the motor 30 to the motor controller 20. While in this embodiment the encoder 40 is exemplified as the rotational angle detector, it is also possible to use any other sensor capable of detecting the rotational angle of the motor 30, examples including, but not limited to, a resolver.

The torque sensor 50 is a sensor that detects the torque of the motor 30. Examples of the torque sensor 50 include, but are not limited to, a non-contact torque sensor and a contact torque sensor. The torque sensor 50 sends the torque of the motor 30 to the motor controller 20.

The I/O device 60 is a general-purpose input-output unit that connects with other devices such as a sensor. The I/O device 60 includes a plurality of input-output connectors. The I/O device 60 is used to provide additional input-output connectors that the motor control system 1 lacks. For example, the I/O device 60 may be connected with various sensors such as a pressure sensor and a fiber sensor. The I/O device 60 sends to the motor controller 20 information input from sensors connected with the I/O device 60.

The temperature sensor 70 is a sensor that detects the temperature of the motor 30 and/or the temperature of a vicinity of the motor 30. Examples of the temperature sensor 70 include, but are not limited to, a resistance temperature detector and a thermocouple. The temperature sensor 70 sends the temperature of the motor 30 and/or the temperature of a vicinity of the motor 30 to the motor controller 20.

The upper-level communication path 80 is a communication line that complies with any communication standard. For example, the upper-level communication path 80 may be a half-duplex communication path or may be a full-duplex communication path. The upper-level communication path 80 connects the upper-level communication port 24A of the motor controller 20 to the upper-level controller 10 so that the upper-level controller 10 may send an instruction to the motor controller 20. Specifically, one end of the upper-level communication path 80 is connected to the communication port 14B of the upper-level controller 10, and the other end of the upper-level communication path 80 is connected to the upper-level communication port 24A of the motor controller 20. The upper-level communication path 80 may include a relay, such as a hub, provided somewhere along the upper-level communication path 80. Through the upper-level communication path 80, the upper-level controller 10 sends an instruction to the motor controller 20. Also through the upper-level communication path 80, the motor controller 20 sends to the upper-level controller 10 a result of controlling the motor 30 and results of detections by the sensors.

The lower-level communication path 90 is a communication line that complies with any communication standard. For example, the upper-level communication path 80 may be a half-duplex communication path or a full-duplex communication path. The lower-level communication path 90 may comply with a communication standard identical to the communication standard with which the upper-level communication path 80 complies. Alternatively, the lower-level communication path 90 may comply with a communication standard different from the communication standard with which the upper-level communication path 80 complies. The lower-level communication path 90 is connected to the lower-level communication port 24C of the motor controller 20, and connects the encoder 40 in series to the torque sensor 50, the I/O device 60, and the temperature sensor 70. The encoder 40 detects the rotational angle of the motor 30. The torque sensor 50, the I/O device 60, and the temperature sensor 70 are examples of the output device recited in the appended claims as outputting at least one piece of associated information among a first piece of associated information and a second piece of associated information, the first piece of associated information being associated with the motor and being different from the rotational angle of the motor, the second piece of associated information being associated with an industrial device associated with the motor. In addition to the encoder 40, other devices associated with the motor 30 may be connected to the I/O device 60, examples including, but not limited to, a sensor to detect the rotational angle of the motor 30.

Examples of the industrial device associated with the motor 30 include, but are not limited to, a sensor to detect a physical quantity of the motor 30 and an I/O device or an analog-to-digital (A/D) device to output information detected by this sensor. The output devices illustrated in FIG. 1, such as the torque sensor 50, are non-limiting examples of the industrial device recited in the appended claims as being associated with the motor 30.

As used herein, the associated information refers to information that indicates a state of the motor 30 or the industrial device associated with the motor 30 and that is other than the rotational angle of the motor 30. The associated information may be any information that is variable depending on a state of the motor 30 or the industrial device associated with the motor 30 and that is detectable by a sensor, for example. Examples of the associated information include, but are not limited to, the torque of the motor 30, the temperature of the motor 30, the position of an arm or another object moved by the motor 30, pressure against the object, and a state (for example, temperature) of a sensor to detect these parameters.

The associated information associated with the motor 30 is used to, for example, perform output control of the motor 30, adjust parameters for control of the motor 30, determine whether the motor 30 is abnormal, and estimate the lifetime (durability) of the motor 30. The associated information (for example, sensor temperature) associated with the industrial device associated with the motor 30 is used to, for example, determine whether the industrial device is abnormal, estimate the lifetime (durability) of the industrial device, and determine a value set for the industrial device.

As illustrated in FIG. 1, each of the plurality of devices on the lower-level communication path 90 has at least one of each's upper-level end and lower-level end connected to another device. In this embodiment, the motor controller 20 is the uppermost level of the order of this connection, followed by the encoder 40, the torque sensor 50, the I/O device 60, and the temperature sensor 70. In other words, the plurality of devices on the lower-level communication path 90 make up what is called a multi-drop connection (or may make up a cascade connection or a daisy-chain connection). Specifically, an upper-level device and a lower-level device are connected to each other on a one-to-one basis. As used herein, the term "upper-level" refers to a side from which an instruction is sent and at which a response is received, and the term "lower-level" refers to a side at which an instruction is received and from which a response is sent. The lower-level communication path 90 is connected to the lower-level communication port 24C of the motor controller 20, instead of being connected to the upper-level communication port 24A. The lower-level communication port 24C is dedicated to the devices including the encoder 40.

The order of connection of the devices on the lower-level communication path 90 may be stored in advance in the memory 22 of the motor controller 20 or in the memories of the devices. Each of the devices may include an upper-level communication port and a lower-level communication port. In this case, each device may receive information at the upper-level communication port and send the information from the lower-level communication port; and receive information at the lower-level communication port and forward the information from the upper-level communication port. That is, each device may not necessarily store information to identify the each device's level in the order of connection, and may forward information without being aware of the order of connection.

The upper-level communication path 80 and the lower-level communication path 90 are separate, independent networks, and the motor controller 20 functions as a gateway to connect these networks to each other. For example, the upper-level communication path 80 and the lower-level communication path 90 may be different from each other in at least one of communication protocol and communication period. While the upper-level communication path 80 and the lower-level communication path 90 may be different from each other in at least one of communication protocol and communication period, the following description of this embodiment will be under the assumption that the upper-level communication path 80 and the lower-level communication path 90 are different from each other in both communication protocol and communication period.

For example, the motor controller 20 communicates with the upper-level controller 10 based on a first communication protocol and through the upper-level communication path 80, and communicates with the devices including the encoder 40 based on a second communication protocol different from the first communication protocol and through the lower-level communication path 90. In this embodiment, the first communication protocol is a general-purpose communication protocol for various industrial applications, and the second communication protocol is a dedicated communication protocol for sensors and I/O devices. The first communication protocol and the second communication protocol are different from each other in, for example, communication procedure to establish a communication and in format of communication data that is sent and received.

For further example, the motor controller 20 communicates with the upper-level controller 10 based on a first communication period and through the upper-level communication path 80, and communicates with the devices including the encoder 40 based on a second communication period different from the first communication period and through the lower-level communication path 90. The first communication period and the second communication period may be different from each other in length of time. In this embodiment, the second communication period is shorter than the first communication period. For example, the first communication period may be some hundreds of microseconds (μs), and the second communication period may be some tens of μs. In this case, in order to make the start time point of the first communication period match the start time point of the second communication period, the first communication period may be an integral multiple of the second communication period.

In every second-communication period, the motor controller 20 sends an instruction to the devices on the lower-level communication path 90 and, as a response to the instruction, receives the rotational angle and the associated information from the devices. For example, at the start of the second communication period, the motor controller 20 sends an instruction of a predetermined format to the lower-level communication path 90. This instruction is intended to cause each of the devices on the lower-level communication path 90 to return a response, and is forwarded from an upper-level device to a lower-level device in the order of connection. For example, an n-th level device in the order of connection (n being an integer of equal to or more than two) on the lower-level communication path 90 receives the instruction from the (n−1)-th level device in the order of connection, and forwards the instruction to the (n+1)-th level device in the order of connection. The lowermost-level device in the order of connection receives the instruction but does not forward the instruction to anywhere, since there is nowhere to forward the instruction to behind the lowermost-level device.

In the embodiment of FIG. 1, the motor controller 20 sends the instruction to the encoder 40, which is one level lower than the motor controller 20 in the order of connection. Then, the encoder 40 sends the received instruction to the torque sensor 50, which is one level lower than the encoder 40 in the order of connection. The torque sensor 50 sends the received instruction to the I/O device 60, which is one level lower than the torque sensor 50 in the order of connection. The I/O device 60 sends the received instruction to the temperature sensor 70, which is one level lower than the I/O device 60 in the order of connection. In this manner, the instruction sent from the uppermost-level motor controller 20 is received by the devices, down to the lowermost-level temperature sensor 70.

In response to the received instruction, the devices on the lower-level communication path 90 send the rotational angle and the associated information to the motor controller 20. For example, the encoder 40, the torque sensor 50, and the temperature sensor 70 send to the motor controller 20 information of their own detection, and the I/O device 60 sends to the motor controller 20 information obtained by a sensor connected to the I/O device 60. The devices may obtain the rotational angle and the associated information in response to the received instruction and send the obtained the rotational angle and associated information. Alternatively, the devices may obtain the rotational angle and the associated information in advance and store them in the devices' memories, and in response to the received instruction, may read the rotational angle and the associated information from the memories and send the rotational angle and the associated information read from the memories.

The rotational angle and the associated information are forwarded from a lower-level device to an upper-level device in the order of connection on the lower-level communication path 90. For example, the n-th level device in the order of connection receives information from the (n+1)-th level device in the order of connection. Then, the n-th level device sends self-detection information or obtained information and the information received from the (n+1)-th level device to the (n−1)-th level device in the order of connection. The uppermost-level device in the order of connection receives these kinds of information but does not forward these kinds of information to anywhere, since there is nowhere to forward these kinds of information to beyond the uppermost-level device. In this embodiment, however, the motor controller 20 is the uppermost-level device and, at any convenient timing, may forward the received information to the upper-level controller 10 through the upper-level communication path 80.

In the embodiment of FIG. 1, the temperature sensor 70, in response to the instruction, sends a temperature detected by the temperature sensor 70 itself to the I/O device 60, which is one level upper than the temperature sensor 70 in the order of connection. The I/O device 60 sends the received temperature and associated information detected by the sensors connected to the input-output connector of the I/O device 60 to the torque sensor 50, which is one level upper than the I/O device 60 in the order of connection. The torque sensor 50 sends the received associated information, the received temperature, and a torque detected by the torque sensor 50 itself to the encoder 40, which is one level upper than the torque sensor 50 in the order of connection. The encoder 40 sends the received torque, the received associated information, the received temperature, and a rotational angle detected by the encoder 40 itself to the motor controller 20, which is one level upper than the encoder 40 in the order of connection.

This configuration enables the motor controller 20 to obtain information output from the devices connected to the lower-level communication path 90. In this embodiment, the period of time for which the motor controller 20 sends the instruction and receives the information output from the devices is within one communication period. That is, the motor controller 20 is able to send an instruction at the start of every communication period and receive information output from the devices.

The motor controller 20 performs a predetermined processing based on the motor 30's rotational angle and associated information obtained through the lower-level communication path 90, and sends a result of the predetermined processing to the upper-level controller 10 through the upper-level communication path 80. The predetermined processing includes aggregation processing and analysis processing that are performed with respect to the rotational angle and the associated information, and may be chosen as desired according to the application in which the motor control system 1 is to be used. More specifically, the predetermined processing may be a processing to accumulate the rotational angle and the associated information in the memory 22 or may be a processing to calculate statistics of the rotational angle and the associated information. In these cases, the motor controller 20 sends the rotational angle and the associated information accumulated in the memory 22 to the upper-level controller 10, or sends the calculated statistics to the upper-level controller 10.

For further example, in an application in which the motor control system 1 is used for injection molding of resin, the motor controller 20 may obtain pressure information through the I/O device 60, aggregate or analyze the pressure information, and send the aggregated or analyzed pressure information to the upper-level controller 10. The motor controller 20 may not necessarily send to the upper-level controller 10 the motor 30's rotational angle and associated information obtained through the lower-level communication path 90. Instead, the motor controller 20 may use the motor 30's rotational angle and associated information for the motor controller 20 itself. For example, the motor controller 20 may perform a processing to analyze the pressure information obtained through the I/O device 60 and determine an output to the motor 30, thereby adjusting the pressure to push resin out.

Based on a result of the above-described processing received from the motor controller 20, the upper-level controller 10 sends an instruction to the motor controller 20 or accumulates the received result in the memory 12 in the form of a log. The upper-level controller 10 performs predetermined processing(s), which may include uploading the received result to a server through the communication port 14A or outputting an alert based on the received result.

In the motor control system 1 described hereinbefore, the devices including the encoder 40 are connected in series to each other through the lower-level communication path 90. This configuration minimizes the number of wires in the motor control system 1 in comparison with cases where, for example, a plurality of sensors are connected to the upper-level controller 10 and the motor controller 20 through individual communication paths. Additionally, the devices including the encoder 40 send information directly to the motor controller 20, instead of through the upper-level controller 10. This configuration increases the speed of processing performed by the motor controller 20. The motor controller 20 performs a predetermined processing based on the motor 30's rotational angle and associated information. This configuration reduces the processing load of the upper-level controller 10. If the devices including the encoder 40 were connected to the upper-level communication path 80 and the motor 30's rotational angle and associated information were sent directly to the upper-level controller 10, the upper-level controller 10 itself would need to perform the predetermined processing and forward the received information. In this embodiment, it is the motor controller 20 that performs the predetermined processing. This configuration reduces the processing load of the upper-level controller 10. In consideration of such an application that it might be necessary for the upper-level controller 10 itself to perform analysis processing, the motor 30's rotational angle and associated information may be accumulated in the memory 22 of the motor controller 20. This configuration enables the upper-level controller 10 to, when the analysis processing is necessary, demand the motor 30's rotational angle and associated information from the motor controller 20 through the upper-level communication path 80 and to perform the analysis processing. For further example, in such an application that the upper-level controller 10 controls a large number of motor controllers 20, the communication traffic volume on the upper-level communication path 80 generally increases. In consideration of the increase, in this embodiment, the devices including the encoder 40 are connected to the lower-level communication path 90, which is on the motor controller 20 side. This configuration eliminates or minimizes the increase in the communication traffic volume on the upper-level communication path 80, even in the application that the upper-level controller 10 controls a large number of motor controllers 20. Having the predetermined processing performed in the motor controller 20 improves efficiency of utilizing the motor control system 1 as a whole. As a result, the motor control system 1 reduces physical costs and/or processing costs.

In this embodiment, the communication protocol of the upper-level communication path 80 and the communication protocol of the lower-level communication path 90 are different from each other. This configuration enables a dedicated communication protocol to be used for the lower-level communication path 90, and increases the speed of processing in comparison with cases where the same general-purpose communication protocol is used for the upper-level communication path 80 and the lower-level communication path 90.

Also in this embodiment, the communication period of the upper-level communication path 80 and the communication period of the lower-level communication path 90 are different from each other. This configuration enables networks of different communication periods to coexist in the motor control system 1. For example, making the communication period of the lower-level communication path 90 shorter than the communication period of the upper-level communication path 80 enables the motor controller 20 to more frequently obtain the rotational angle and the associated information and thus more quickly detect changes in torque and temperature. Additionally, the motor controller 20 obtains results of detection of the rotational angle and the associated information through the lower-level communication path 90, and sends these results collectively to the upper-level controller 10. This configuration eliminates or minimizes missed sending of the rotational angle and the associated information.

The above-described embodiment is not intended in a limiting sense.

In another possible embodiment, to the output device (such as the torque sensor 50, the I/O device 60, and the temperature sensor 70) that outputs associated information, the motor controller 20 may send a setting value related to control of the output device. Examples of the setting value include, but are not limited to, a threshold on which the sensing function of the output device is turned on and off, and a threshold on which the output device determines whether the physical quantity (for example, the level of torque and temperature) that the output device has detected is abnormal. For further example, the setting value may be included in the instruction that the motor controller 20 sends to the output device in every-second communication period. Upon receipt of this setting value, the output device may write the received setting value in the memory of the output device. In this case, the output device operates based on the setting value written in the memory of the output device, and outputs the associated information. The motor controller 20 may send this setting value to the encoder 40. In this case, the encoder 40 stores the setting value in the memory of the encoder 40, and detects and sends the rotational angle.

In the above-described embodiment, the output devices connected in series to each other through the lower-level communication path 90 are the torque sensor 50, the I/O device 60, and the temperature sensor 70. In another possible embodiment, any other sensors capable of outputting associated information may be connected to the lower-level communication path 90. For example, as described above, a sensor to detect the rotational angle of the motor 30 may be connected to the I/O device 60. For further example, when the motor control system 1 is applied in a robot system, an acceleration sensor to detect the acceleration of a robot arm moved by the motor 30 and an inner-force sensor disposed at a fingertip of the robot arm may be connected to the lower-level communication path 90. For further example, when there is a deficiency of AD device in the motor control system 1, an additional AD device may be connected to the lower-level communication path 90. In this case, the additional AD device is connected to an output device that outputs an analogue signal (a non-limiting example of such output device is a pressure sensor amplifier that outputs an analogue signal). The additional AD device converts the analogue signal output from the output device into a digital signal, and outputs the digital signal to the motor controller 20.

In the above-described embodiment, the upper-level controller 10 is connected to the single motor controller 20, and the motor controller 20 controls the single motor 30, for simplicity of description. In another possible embodiment, a plurality of motor controllers 20 and motors 30 may be included in the motor control system 1. For example, the upper-level controller 10 may send an instruction to a plurality of motor controllers 20, and a single motor controller 20 may control a plurality of motors 30. Additionally, a plurality of upper-level controllers 10 may be included in the motor control system 1. In this case, the communication port 14B, the upper-level communication port 24A, and the power outputter 24B may be plural. Also, a plurality of lower-level communication paths 90 may be connected to the motor controller 20. That is, the motor controller 20 may include a plurality of lower-level communication ports 24C respectively connectable to a plurality of device groups (each device group being made up of the series of four devices illustrated in FIG. 1, namely, the encoder 40, the torque sensor 50, the I/O device 60, and the temperature sensor 70). In this case, a plurality of lower-level communication paths 90 exist, and these plurality of lower-level communication paths 90 may be used differently; one lower-level communication path 90 may be used for encoders, and another lower-level communication path 90 may be used for output devices such as sensors.

2. Embodiment 2

The motor control system 1 according to embodiment 2 will be described. In embodiment 2, the motor controller described in embodiment 1 will be referred to as master device, and the rotational angle detector or the output device described in embodiment 1 will be referred to as slave device.

According to the inventors' knowledge and experience, although a motor control system with a plurality of slave devices such as an encoder connected in series to a motor controller does reduce the number of wires, the motor controller is unable to make an instruction to all the slave devices and control an individual slave device. One possible way to address to this situation is to connect the slave devices directly to the motor controller. Although this configuration makes the slave devices individually controllable by the motor controller, it is necessary to provide the same number of communication paths as the number of the slave devices, resulting in an increase in the number of wires. As a result of studies conducted by the inventors in an attempt to make an instruction to all the slave devices and control an individual slave device while reducing the number of wires, the inventors conceived of a novel and unique motor control system and associated apparatuses and/or devices. A motor control system and associated apparatuses and/or devices according to embodiment 2 will be described in detail below.

2-1. General Arrangement of Embodiment 2

Figure 2:
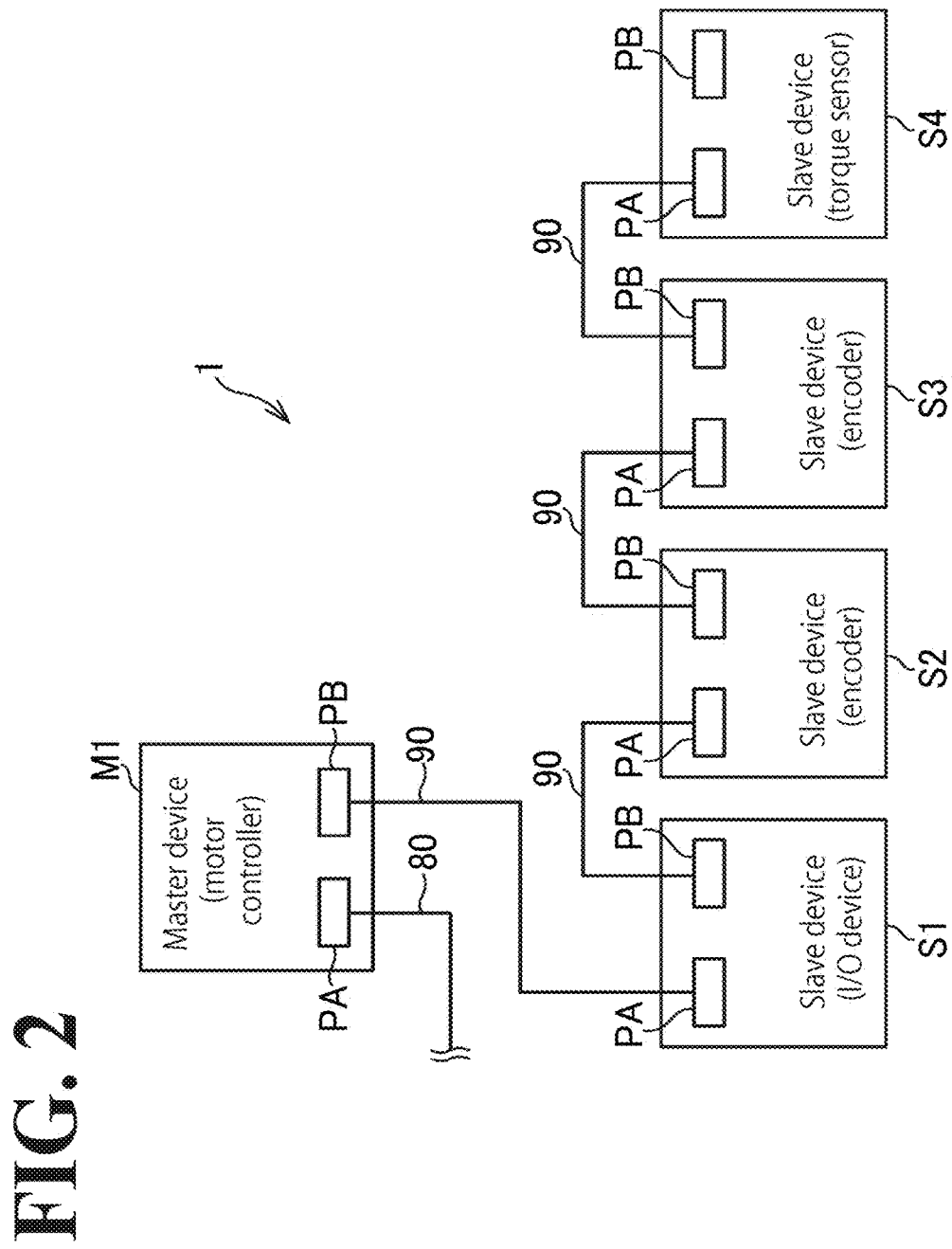
FIG. 2 illustrates a general arrangement of a motor control system according to embodiment 2.

FIG. 2 illustrates a general arrangement of a motor control system 1 according to embodiment 2 As illustrated in FIG. 2, the motor control system 1 includes a master device M1 and a plurality of slave devices S1 to S4 (the slave devices S1 to S4 will be hereinafter collectively referred to as slave device S or slave devices S). Similarly to embodiment 1, the slave devices S are connected in series to each other through the lower-level communication path 90.

The master device M1 may have a hardware configuration similar to the hardware configuration of the motor controller 20 according to embodiment 1. As illustrated in FIG. 2, an upper-level communication port PA may be similar to the upper-level communication port 24A, and a lower-level communication port PB may be similar to the lower-level communication port 24C. In embodiment 2, the master device M1 controls two motors 30. It is noted that the configuration of the master device M1 will not be elaborated here except for the configuration of the upper-level communication port PA and the configuration of the lower-level communication port PB. Also, the configuration of the two motors 30 will not be elaborated here, either.

In embodiment 2, the slave device S1 is an I/O device and may be similar to the I/O device 60 according to embodiment 1. The slave devices S2 and S3 each may be similar to the encoder 40 according to embodiment 1. The slave device S2 detects the rotational angle of a first motor, and the slave device S3 detects the rotational angle of a second motor. The slave device S4 detects the torque of the second motor and may be similar to the torque sensor 50 according to embodiment 1.

In embodiment 2, the slave device S includes the upper-level communication port PA and the lower-level communication port PB. The upper-level communication port PA of the slave device S1 is connected to the lower-level communication port PB of the master device M1 through the lower-level communication path 90. The lower-level communication port PB of the slave device S1 is connected to the upper-level communication port PA of the slave device S2, which is one level lower than the slave device S1, through the lower-level communication path 90. Similarly, the lower-level communication port PB of the slave device S2 is connected to the upper-level communication port PA of the slave device S3, which is one level lower than the slave device S2, through the lower-level communication path 90. The lower-level communication port PB of the slave device S3 is connected to the upper-level communication port PA of the slave device S4, which is one level lower than the slave device S3, through the lower-level communication path 90. The slave device S4 is at the lowermost level in the order of connection, and thus no device is connected to the lower-level communication port PB of the slave device S4.

In the motor control system 1 according to embodiment 2, the master device M1 is capable of communicating with all the slave devices S and communicating with one or some of the slave devices S. The master device M1 is also not only capable of receiving rotational angle and associated information from each slave device S but also capable of writing information in a particular slave device S. These configurations will be detailed below.

2-2. Functions Implemented in Motor Control System According to Embodiment 2

Figure 3:
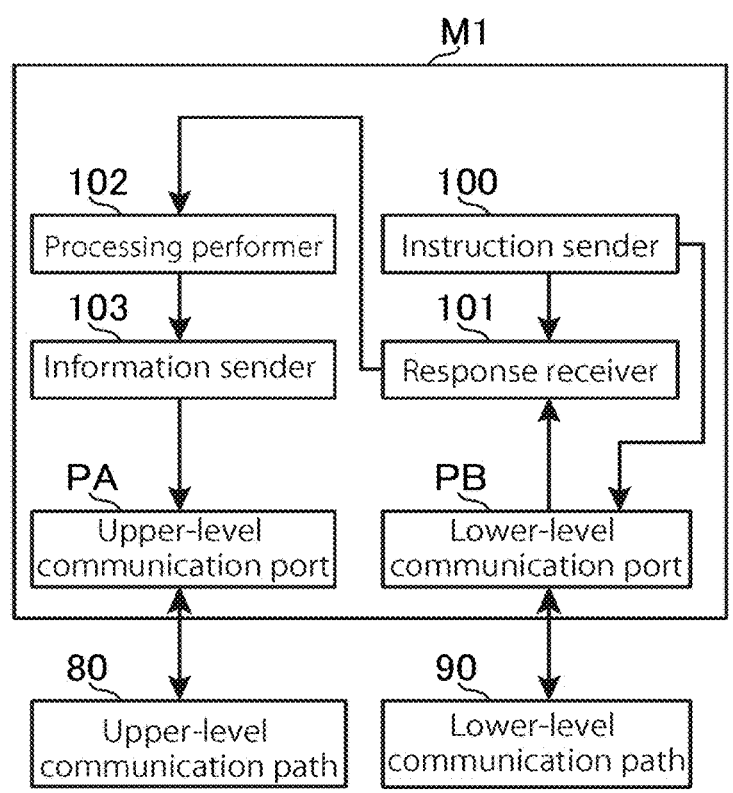
FIG. 3 is a functional block diagram of functions implemented by a master device.
Figure 4:
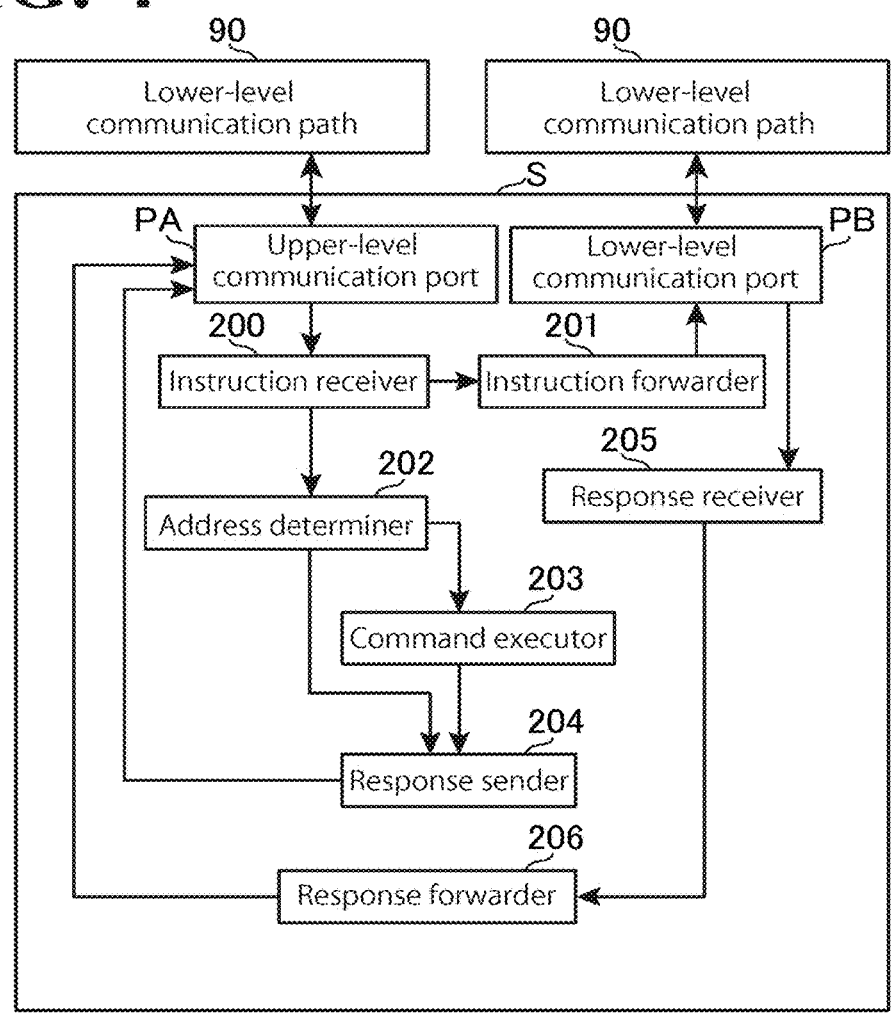
FIG. 4 is a functional block diagram of functions implemented by a slave device.

FIG. 3 is a functional block diagram of functions implemented by the master device M1. FIG. 4 is a functional block diagram of functions implemented by the slave device S. As illustrated in FIG. 3, the functions of the master device M1 include an instruction sender 100, a response receiver 101, a processing performer 102, and an information sender 103. As illustrated in FIG. 4, the functions of the slave device S include an instruction receiver 200, an instruction forwarder 201, an address determiner 202, a command executor 203, a response sender 204, a response receiver 205, and a response forwarder 206.

When the instruction sender 100 communicates with all the slave devices, the instruction sender 100 sends a general instruction to all the slave devices from the lower-level communication port PB of the instruction sender 100. When the instruction sender 100 communicates with one or some of the slave devices S, the instruction sender 100 sends an individual instruction to the one or some of the slave devices S from the lower-level communication port PB of the instruction sender 100, so as to control the one or some of the slave devices S.

The general instruction is an instruction common to all the slave devices S. A non-limiting example of the general instruction is a synchronization instruction to synchronize the slave devices S. In the following description, the communication method by which the instruction sender 100 sends the general instruction will be referred to as one-to-N communication. N is an integer of equal to or more than two and indicates the number of the slave devices S on the lower-level communication path 90.

The individual instruction is an instruction to a particular slave device(s) S among all the slave devices S. For example, the individual instruction may contain a command to the particular slave device(s) S and a parameter. The instruction sender 100 sends the individual instruction to a number of slave devices S smaller than N. In this embodiment, the instruction sender 100 sends the individual instruction to one slave device S. In the following description, the communication method by which the instruction sender 100 sends the individual instruction to any one slave device S will be referred to as one-to-one communication.

The general instruction and the individual instruction each may be sent in a transmission frame of a data format specified by a communication protocol. While the general instruction and the individual instruction may have the same data formats, the general instruction and the individual instruction according to embodiment 2 have different data formats.

Figure 5:
FIG. 5 illustrates an exemplary data format of a general instruction.

FIG. 5 illustrates an exemplary data format of the general instruction. That is, FIG. 5 illustrates a transmission frame of an instruction in one-to-N communication. As illustrated in FIG. 5, the instruction for one-to-N communication contains an address A, a communication period counter CT, and a check code CRC.

The address A includes destination information of the general instruction. For example, since in the one-to-N communication the master device M1 communicates with all the slave devices S, a broadcast address common to all the slave devices S is stored in the address A as the destination information. In another possible embodiment, the address A of the general instruction may include source information of the general instruction. Specifically, the address of the master device M1 may be stored in the address A as the source information. The destination information and the source information may be other than an address insofar as the destination and the source are identifiable by the information. For example, it is possible to use serial numbers of the master device M1 and the slave device S as the destination information and the source information. The destination information and the source information may be unique to the master device M1 and the slave device S.

The communication period counter CT is information to identify how many communication periods there have been. On the lower-level communication path 90, fixed-period communication is performed. The communication period counter CT gets an increment in every communication period. As detailed in another embodiment later, the communication period counter CT is used to identify when the slave devices S return responses. More specifically, the communication period counter CT is used when the slave devices S return responses over a length of time crossing the point of time between two communication periods. In embodiment 2, the slave devices S return responses in every communication period, and therefore, the communication period counter CT may be removed from the general instruction.

The check code CRC is code information used in error sign detection of the general instruction. The error sign detection may be performed by any of various known methods, examples including, but not limited to, cyclic redundancy checking of any convenient bit number.

Figure 6:
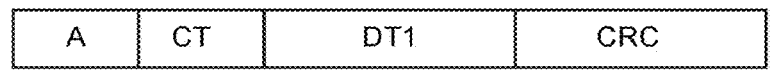
FIG. 6 illustrates an exemplary data format of an individual instruction.

FIG. 6 illustrates an exemplary data format of the individual instruction. That is, FIG. 6 illustrates a transmission frame of an instruction in one-to-one communication. As illustrated in FIG. 6, the individual instruction contains an address A, a communication period counter CT, data DT1, and a check code CRC. Except for the address A and the data DT1, the individual instruction is similar to the general instruction.

The address A of the individual instruction includes destination information, similarly to the address A of the general instruction. It is noted, however, that the destination information stored in the address A of the individual instruction is not the broadcast address but the address of a slave device S at which the individual instruction is targeted. In other words, the address of the communication-end slave device S in one-to-one communication is stored as the destination information. For example, in a one-to-one communication with the slave device S1, the address of the slave device S1 is stored in the address A. In a one-to-one communication with any of the slave devices S2 to S4, the address of any of the slave devices S2 to S4 is stored in the address A. In another possible embodiment, the address A of the individual instruction may include source information of the individual instruction, similarly to the general instruction.

In embodiment 2, the master device M1 stores in advance in its memory 22 the address of the master device M1, the broadcast address, and the addresses of the slave devices S. The addresses of the slave devices S each may be a fixed value or may be dynamically assigned by the master device M1 at any convenient timing such as initialization timing. For example, according to a predetermined assignment rule, the master device M1 may assign the upper to lower-level slave devices S values (IDs) in ascending order such as "1", "2", and so forth. The master device M1 records the addresses assigned to the slave devices S in the memory 22.

The data DT1 is a data area in which the details of the individual instruction is stored. In the data DT1, a command for one or some of the slave devices S to execute may be stored. In this case, a value indicating the kind of the command is stored in the data DT1. The command may be any command to control the one or some of the slave devices S, examples including, but not limited to, a command to control the one or some of the slave devices S to write setting information. As used herein, the setting information is information to be set in the slave device S, examples including, but not limited to, a setting value of a parameter of the slave device S. When the data DT1 contains a command to write setting information of the one or some of the slave devices S, the data DT1 may further contain the setting information of the one or some of the slave devices S.

The command contained in the data DT1 of the individual instruction will not be limited to the above-described example; another possible example is an instruction to activate or inactivate the sensor function of the slave device S. Still another possible example when the slave device S is an I/O device to which a plurality of sensors are connected is an instruction to specify which information the slave device S should output from among a plurality of kinds of information provided from the plurality of sensors. Still another possible example when the slave device S has a predetermined alarm function is an instruction to change the threshold of the alarm.

In embodiment 2, in response to the general instruction, each of the slave devices S automatically returns a predetermined response. This configuration eliminates the need for containing in the general instruction a command for the slave device S to execute. Accordingly, the general instruction illustrated in FIG. 5 contains no data DT1 and thus has a shorter data length, minimizing the communication traffic volume on the lower-level communication path 90.

Figure 7:
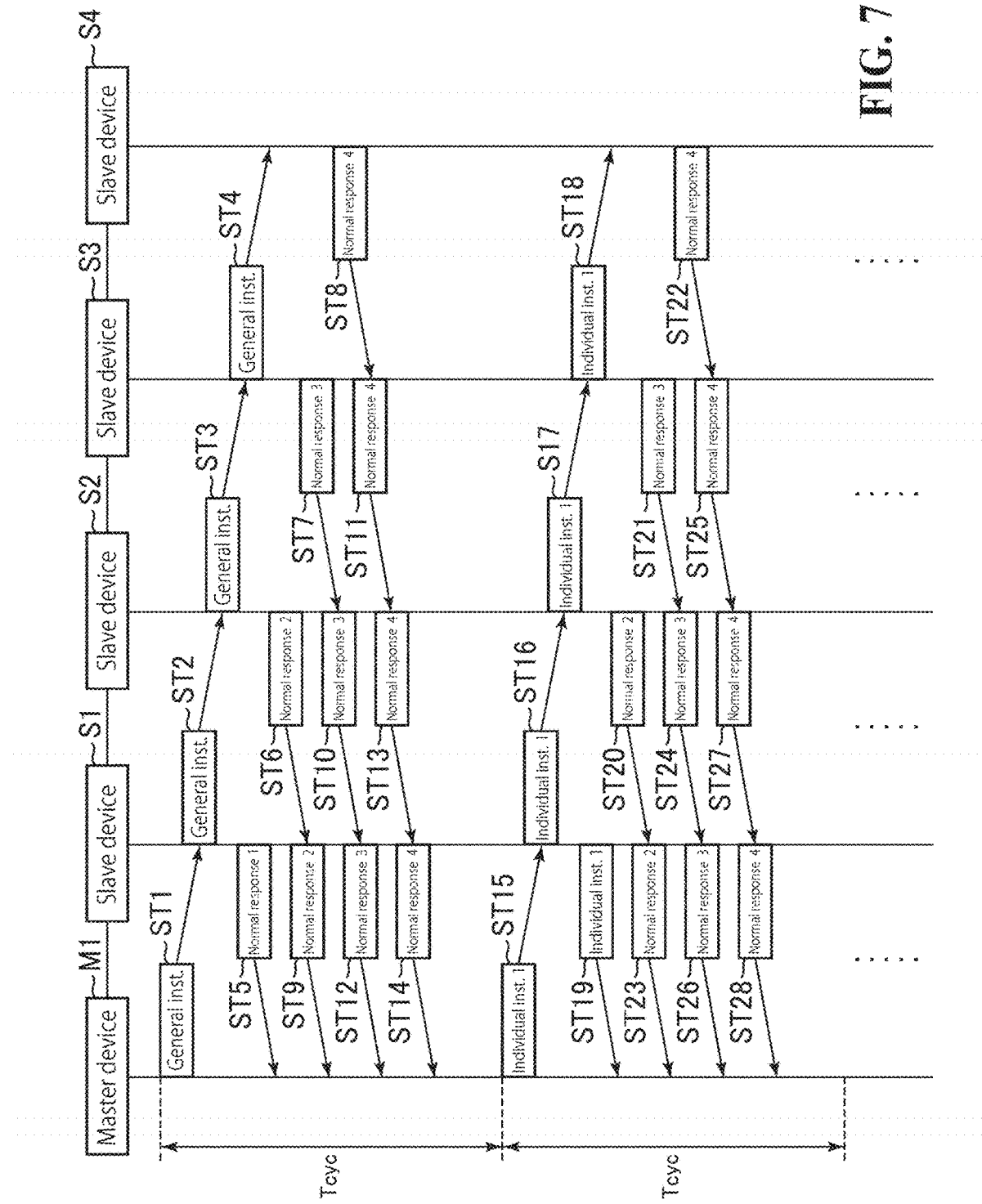
FIG. 7 illustrates an exemplary one-to-N communication and an exemplary one-to-one communication.

FIG. 7 illustrates an exemplary one-to-N communication and an exemplary one-to-one communication. By referring to FIG. 7, the functions of the master device M1 and the slave device S will be detailed. As illustrated in FIG. 7, at the start of communication period $T_{cyc}$ of one-to-N communication, the instruction sender 100 of the master device M1 sends a general instruction to the slave device S1 (step ST1).

At the slave device S1, the instruction receiver 200 receives from the upper-level communication port PA the general instruction sent from the master device M1, and the instruction forwarder 201 forwards the general instruction received by the instruction receiver 200 to the lower-level slave device S2 (step ST2). Here, the instruction forwarder 201 receives the general instruction from the upper-level communication port PA and forwards the general instruction as it is from the lower-level communication port PB. At subsequent steps ST3 and ST4, the instruction forwarders 201 of the slave devices S2 and S3 forward the general instruction, received from the upper-level slave devices S, to the lower-level slave devices S. The lowermost-level slave device S4 has nowhere to forward the general instruction to behind the lowermost-level slave device S4, and thus may not necessarily include the instruction forwarder 201.

At each slave device S, after the instruction receiver 200 has received an instruction, the address determiner 202 determines whether the command contains a broadcast address or the address of the slave device S itself. Specifically, the address determiner 202 determines whether a broadcast address or the address of the slave device S itself is stored in the address A of the received instruction. The address determiner 202 thus analyzes the address A so as to determine whether the received instruction is a general instruction, which is for all the slave devices S, an individual instruction for the slave device S itself, or an individual instruction for another slave device S.

In embodiment 2, each slave device S stores in advance in its memory the broadcast address and the address of the slave device S itself. For example, the master device M1 may dynamically assign an address to each slave device S. In this case, the slave device S may store the assigned address in the memory of the slave device S. In embodiment 2, the memory of the slave device S stores no address of any other slave device S. In another possible embodiment, the memory of the slave device S may store the address of some other slave device S. When the memory of the slave device S stores the address of some other slave device S, the address determiner 202 may determine whether the address of the other slave device S is stored in the address A.

Figure 8:
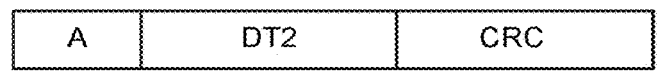
FIG. 8 illustrates an exemplary format of a transmission frame of a response.

Based on the determination made by the address determiner 202, the response sender 204 of each slave device S sends a response. FIG. 8 illustrates an exemplary format of a transmission frame of the response. In embodiment 2, the response to the general instruction and the response to the individual instruction are identical to each other in format. In another possible embodiment, the responses may have different formats. As illustrated in FIG. 8, the response contains an address A, data DT2, and a check code CRC. Except for the address A and the data DT2, the response is similar to the above-described instructions.

In the address A, source information of the response is stored. For example, the address of a slave device S that sends the response is stored in the address A as the source information. In another possible embodiment, the address A may include destination information of the response. In this case, the address of the master device M1 may be stored in the address A as the destination information.

The data DT2 is a data area in which the contents of the response to the instruction is stored. In the case of the general instruction, the response sender 204 sends a response that includes rotational angle or associated information. Therefore, the rotational angle or the associated info Illation is stored in the data DT2.

Referring again to FIG. 7, when at steps ST1 to ST4 the general instruction has been sent, the address determiner 202 of each slave device S determines that a broadcast address is stored in the address A of the general instruction. Then, the response sender 204 of each slave device S sends a response to the general instruction. In the following description, the response to the general instruction will be referred to as normal response.

For example, the response sender 204 of the slave device S1 sends a normal response in which associated information output from the slave device S1 itself is stored in the data DT2 (step ST5). Here, the slave device S1 may store, in its memory, associated information obtained in advance, and at step ST5, read the associated information from the memory and store the associated information in the normal response. Alternatively, in response to the received general instruction, the slave device S1 may obtain and store associated information in the normal response. Similarly, at steps ST6 to ST8, the response sender 204 of each of the slave devices S2 to S4 sends a normal response in which rotational angle or associated information output from the each device itself is stored in the data DT2.

At steps ST9 to ST14, the response receiver 205 of each of the slave devices S1 to S3 receives the normal response of the lower-level slave device S from the lower-level communication port PB of each of the slave devices S1 to S3. Then, the response forwarder 206 of each of the slave devices S1 to S3 forwards the received normal response from the upper-level communication port PA of each of the slave devices S1 to S3.

At the master device M1, the response receiver 101 receives the responses of the slave devices S from the lower-level communication port PB of the master device M1. In embodiment 2 illustrated in FIG. 7, the response receiver 101 directly receives the normal response of the uppermost-level slave device S1, and indirectly receives the normal responses of the lower-level slave devices S2 to S4 through the slave devices S1 to S3. Upon receipt of each response, the response receiver 101 develops the response in the memory 22. When the response contains source information of the slave device S, the master device M1 may determine whether the response contains the address of the master device M1 so as to determine whether to accept the response received by the response receiver 101.

The processing performer 102 of the master device M1 performs a predetermined processing based on the information received by the response receiver 101. Then, the information sender 103 of the master device M1 sends a result of the processing performed by the processing performer 102 to the upper-level controller 10 from the upper-level communication port PA. These processings may be similar to the processings described in embodiment 1.

The above-described processings are performed within the communication period $T_{cyc}$ of one-to-N communication. A flow of a one-to-one communication within the communication period $T_{cyc}$ will be described taking as an example an individual instruction sent to the slave device S1. As illustrated in FIG. 7, at the start of the communication period $T_{cyc}$ of one-to-one communication, the instruction sender 100 of the master device M1 sends an individual instruction to the slave device S1 (step ST15). In the address A of the individual instruction, the address of the slave device S1 is stored. In the data DT1 of the individual instruction, a command for the slave device S1 to execute and setting information to be set are stored.

The processings to forward the individual instruction at steps ST16 to ST18 are similar to the processings at steps ST2 to ST4. It is noted, however, that since the address determiner 202 of the slave device S1 determines that the address of the slave device S1 is contained in the individual instruction, the command executor 203 of the slave device S1 executes the command contained in the data DT1 of the individual instruction. That is, when the command executor 203 of the slave device S1 has received an individual instruction addressed to the slave device S1 itself, the command executor 203 executes a command based on the individual instruction.

Since the command may be a command to write setting information as described above, when the command executor 203 of the slave device S1 has received an instruction addressed to the slave device S1, the command executor 203 records setting information in the memory of the command executor 203. That is, in embodiment 2, the command executor 203 also functions as the setting information recorder recited in the appended claims. Once the setting information has been recorded in the memory of the command executor 203, the slave device S operates based on the recorded setting information.

The response to the individual instruction may contain a result obtained by the command executor 203 executing the command. This response will be hereinafter referred to as individual response. The response sender 204 of the slave device S1 sends the individual response in which the result obtained by the command executor 203 executing the command is stored in the data DT2 (step ST19). At step ST19, the response sender 204 stores in the address A the address of the slave device S1 as the source information, and stores in the address A the address of the master device M1 as the destination information. The processing that the master device M1 performs in response to the individual response may be similar to the processing performed in response to the normal response.

When an individual instruction received by the slave devices S2 to S4 is addressed to the slave device S1, the slave devices S2 to S4 need not return a response. Still, in embodiment 2, each of the slave devices S2 to S4 returns a normal response. That is, when the response sender 204 of each of the slave devices S2 to S4 has received an individual instruction addressed to other slave device S, the response sender 204 sends a normal response containing rotational angle or associated information. Thus, at steps ST20 to ST28, normal responses of the slave devices S2 to S4 are forwarded to the master device M1. One-to-one communication with each of the slave devices S2 to S4 is established by processings similar to the above-described processings with the slave device S1. At subsequent steps, the one-to-N communication and the one-to-one communication with any of the slave devices S1 to S4 are repeated in the motor control system 1.

2-3. Processings Performed in Motor Control System

A flow of processings performed in the motor control system 1 will be described. After electric power has been supplied to the motor control system 1, initialization processing, such as address assignment, is performed between the master device M1 and the slave devices S. The following description is concerning operations performed by the master device M1 and the slave devices S after the initialization processing has been completed.

Figure 9:
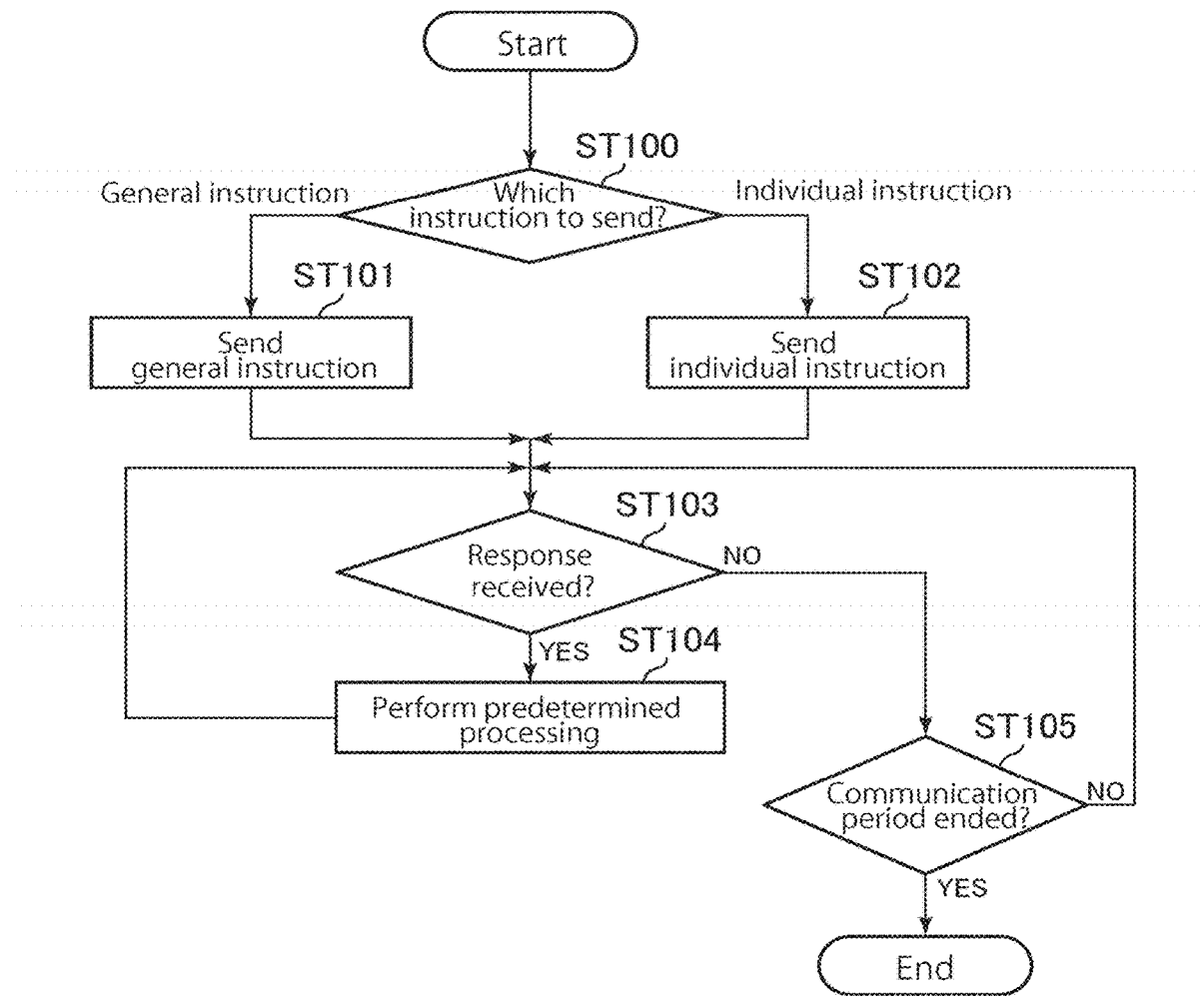
FIG. 9 is a flowchart of processings performed by the master device.

FIG. 9 is a flowchart of processings performed by the master device M1. The processings illustrated in FIG. 9 are performed in every communication period. Referring to FIG. 9, the instruction sender 100 determines whether to send a general instruction or an individual instruction (step ST100). That is, at step ST100, the instruction sender 100 chooses a communication method from one-to-N communication and one-to-one communication. At step ST100, based on predetermined conditions, the instruction sender 100 determines whether to send a general instruction or an individual instruction.

For example, when at step ST100 the instruction sender 100 receives from a slave device S rotational angle or associated information that exceeds a threshold, the instruction sender 100 may make a determination to send an individual instruction to this slave device S. For further example, each slave device S may have its own predetermined timing for one-to-one communication, and when the timing comes, the instruction sender 100 may make a determination to have a one-to-one communication with the each slave device S; at other than this timing, the instruction sender 100 may make a determination to have a one-to-N communication.

When at step ST100 the instruction sender 100 has made a determination to send a general instruction (step ST100; general instruction), the instruction sender 100 sends the general instruction from the lower-level communication port PB to the lower-level communication path 90 (step ST101). At step ST101, the instruction sender 100 reads the broadcast address and the communication period counter from the memory 22, determines a CRC value based on the values of the broadcast address and the communication period counter, stores the CRC value in the transmission frame of the general instruction, and sends the general instruction. Then, the master device M1 waits for responses from the slave devices S.

When at step ST100 the instruction sender 100 has made a determination to send an individual instruction (step ST100; one-to-one communication), the instruction sender 100 sends the individual instruction from the lower-level communication port PB to the lower-level communication path 90 (step ST102). At step ST102, the instruction sender 100 reads from the memory 22 the communication period counter and the address of the slave device S that has been determined as the communication end of the individual instruction, and determines setting information and a command for the communication end to execute. The instruction sender 100 may determine the command and the setting information based on the rotational angle or the associated information received from the communication-end slave device S, or obtain a command and setting information stored in advance in the memory 22. Then, the master device M1 determines a CRC value based on the values of the command and the setting information. In this manner, the master device M1 determines necessary information to be contained in the individual instruction.

After the processing at step ST101 or step ST102, the response receiver 101 determines whether a response has been received from the lower-level communication port PB (step ST103). When the determination made by the response receiver 101 is that a response has been received (step ST103; Yes), the response is developed in the memory 22, and the processing performer 102 performs a predetermined processing (step ST104). Then, the information sender 103, at any convenient timing, sends a result of the processing performed by the processing performer 102 to the upper-level controller 10 from the upper-level communication port PA. The master device M1 may determine whether the address of the master device M1 is stored in the address A of the received response, and determine whether to develop the response in the memory 22.

When at step ST103 the determination made by the response receiver 101 is that no response has been received (step ST103; No), a determination is made as to whether the communication period has ended (step ST105). When the determination is that the communication period has not ended yet (step ST105; No), the processing at step ST103 is performed again, where the master device M1 waits to receive a response. When the determination is that the communication period has ended (step ST105; Yes), processings in the next communication period are performed.

Figure 10:
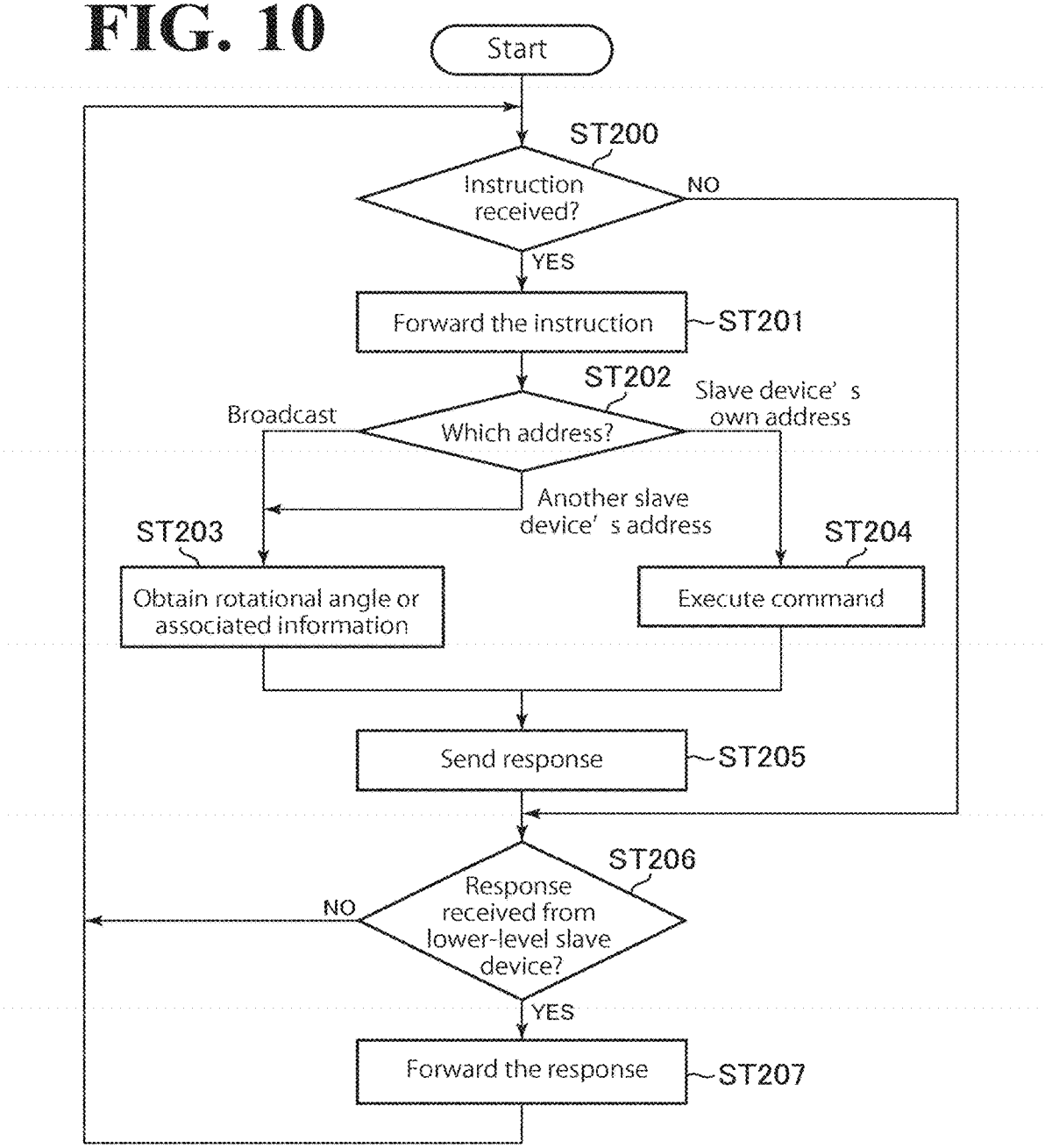
FIG. 10 is a flowchart of processings performed by the slave device.

FIG. 10 is a flowchart of processings performed by the slave device S. As illustrated in FIG. 10, the instruction receiver 200 determines whether an instruction has been received from the upper-level communication port PA (step ST200). When the determination is that an instruction has been received (step ST200; Yes), the instruction forwarder 201 forwards the received instruction from the lower-level communication port PB (step ST201). At step ST201, the instruction forwarder 201 forwards the instruction to the one level-lower slave device S from the lower-level communication port PB.

The address determiner 202 refers to the address A of the received instruction (step ST202). When the broadcast address is stored in the address A (step ST202; broadcast) or when neither the broadcast address nor the address of the device itself is stored in the address A (step ST202; another slave device's address), the response sender 204 sends a normal response. For this purpose, the response sender 204 obtains the rotational angle or the associated information of the slave device S so as to output the rotational angle or the associated information in the normal response (step ST203).

When the address of the slave device S itself is stored in the address A (step ST202; slave device S's own address), the command executor 203 executes the command included in the data DT1 of the received instruction (step ST204). For example, when the command stored in the data DT1 is to write setting information, the command executor 203 writes the setting information in the memory of the slave device S to which the command executor 203 belongs. Then, the command executor 203 forwards a result obtained by executing the command to the response sender 204.

The response sender 204 sends a response from the upper-level communication port PA based on the result obtained at step ST13 or ST14 (step ST205). At step ST205, the response sender 204 stores in the address A the address of the slave device S to which the response sender 204 belongs, and stores in the address A the address of the master device M1. The address of the slave device S is the source information, and the address of the master device M1 is the destination information. Then, the response sender 204 stores in the data DT2 a result obtained at step ST203 or a result obtained at step ST204.

The response receiver 205 determines whether a response by the lower-level slave device S has been received from the lower-level communication port PB (step ST206). When the determination made by the response receiver 205 is that a response has been received from the lower-level communication port PB (step ST206; Yes), the response sender 204 forwards the received response from the upper-level communication port PA (step ST207). When the determination made by the response receiver 205 is that no response has been received (step ST206; No), the processing at step ST200 is performed again, where the slave device S waits to receive the next command.

In the motor control system 1 according to embodiment 2, the slave devices S are connected in series to each other through the lower-level communication path 90. This configuration minimizes the number of wires. Additionally, according to situation, the master device M1 chooses an instruction to use from the general instruction or the individual instruction. This configuration enables the master device M1 to make a general instruction, to all the slave devices S, and control an individual slave device S. For example, when the master device M1 determines that it is necessary to change the operation of the slave device S, the master device M1 sends an individual instruction to the slave device S, causing the slave device S to operate more appropriately.

Here, the individual instruction contains setting information of the slave device S to which the individual instruction is addressed. This configuration enables the master device M1 to set setting information for each individual slave device S. That is, the setting information of the slave devices S is managed at the master device M1. Thus, when the master device M1 determines that it is necessary to change the setting information of a slave device S, the master device M1 is able to change the setting information of the slave device S and cause the slave device S to operate according to the changed setting information.

When the master device M1 has sent an individual instruction to a slave device S, this does not mean that the master device M1 receives no information from other slave devices S than the communication-end slave device S. Instead, the master device M1 receives rotational angles or associated information from other slave devices S. This configuration enables the master device M1 to keep up with the latest rotational angles or the latest associated information even in one-to-one communication. This configuration, in turn, enables the master device M1 to provide latest information to the upper-level controller 10 or to choose which slave device S to send an individual instruction to in the next communication period.

The command contained in the individual instruction from the master device M1 can be set to be executed by one or some of the slave devices S. That is, the master device M1 itself is able to determine a command as being executed by an individual slave device S. Additionally, the master device M1 is able to contain in the individual instruction a command that is based on the rotational angle or the associated information obtained from the one or some of the slave devices S.

In embodiment 2, the individual instruction has mainly been described as being addressed to a single slave device S. In another possible embodiment, the individual instruction may contain instructions addressed to a plurality of slave devices S. In still another possible embodiment, the individual instruction may be addressed to any two or three slave devices S. That is, the individual instruction may be addressed to a number of slave devices S smaller than N.

In embodiment 2, the general instruction and the individual instruction are identifiable by referring to the address A. In another possible embodiment, the general instruction and the individual instruction may be identifiable by referring to information contained in the instruction. For example, the general instruction may be identifiable by general-instruction flag information, and the individual instruction may be identifiable by individual-instruction flag information. For further example, an instruction containing a command may be regarded as an individual instruction, and an instruction containing no command may be regarded as a general instruction. For further example, an instruction in which the address A is NULL, which indicates absent of data, may be regarded as a general instruction. For further example, an instruction containing no address A may be regarded as a general instruction. Any convenient method may be selected from these methods of identifying the general instruction and the individual instruction and specified by a communication protocol.

3. Embodiment 3

In embodiment 2, the motor control system 1 includes a single motor controller. In embodiment 3, the motor control system 1 includes a plurality of motor controllers. The plurality of motor controllers are connected in series to each other, similarly to the slave devices S according to embodiment 2. In the following description of embodiment 3, the uppermost-level motor controller among the plurality of motor controllers will be referred to as master device, and the lower-level motor controller will be referred to as monitor device. Also, the rotational angle detector and the output device according to embodiment 1 each will be referred to as slave device, similarly to embodiment 2.

According to the inventors' knowledge and experience, in a motor control system including a plurality of motor controllers, slave devices are connected in series to each of the plurality of motor controllers. This structure necessitates the same number of channels of lower-level communication paths as the number of the motor controllers, resulting in an increase in the number of wires. As a result of studies conducted by the inventors in an attempt to reduce the number of wires in a motor control system including a plurality of motor controllers, the inventors conceived of a novel and unique motor control system and associated apparatuses and/or devices. A motor control system and associated apparatuses and/or devices according to embodiment 3 will be described in detail below.

3-1. General Arrangement of Embodiment 3

Figure 11:
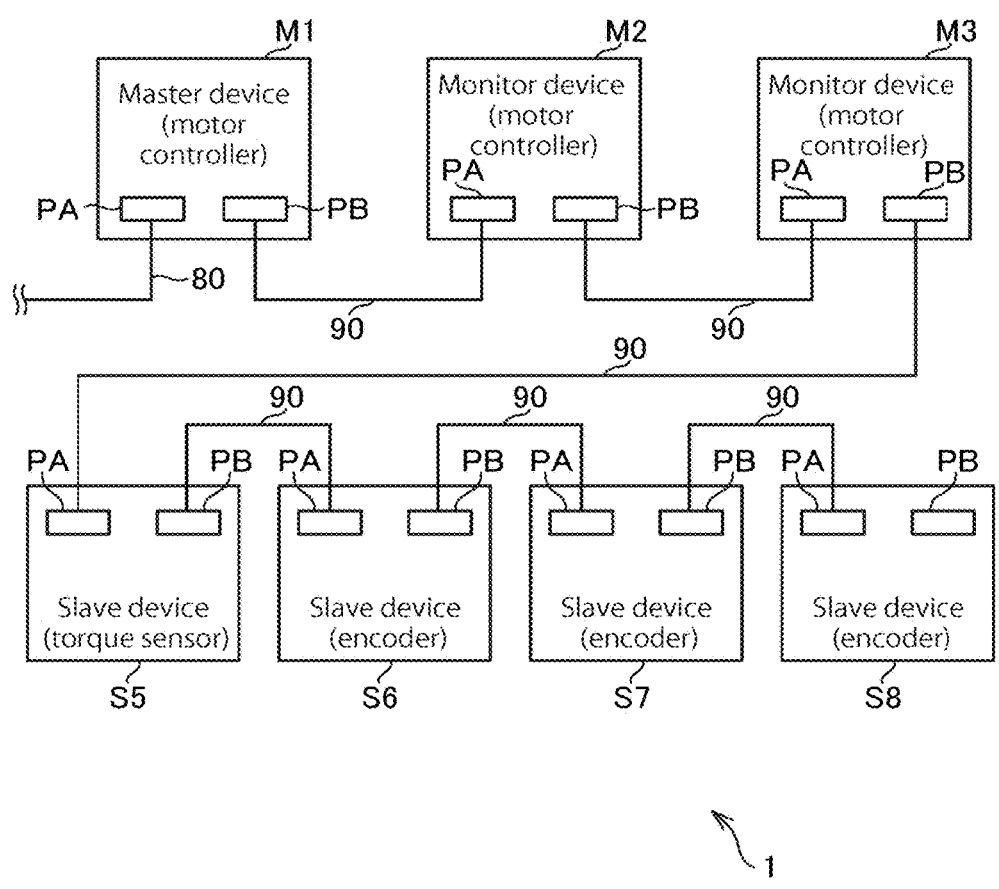
FIG. 11 illustrates a general arrangement of a motor control system according to embodiment 3.

FIG. 11 illustrates a general arrangement of a motor control system 1 according to embodiment 3. As illustrated in FIG. 11, the motor control system 1 includes a master device M1, monitor devices M2 and M3, and a plurality of slave devices S5 to S8 (these slave devices S5 to S8 will be hereinafter collectively referred to as slave device S or slave devices S). As illustrated in FIG. 11, the monitor devices M2 and M3 are connected in series to the slave devices S through the lower-level communication path 90.

The monitor devices M2 and M3 may be similar in hardware configuration to the master device M1. In embodiment 3, each of the master device M1 and the monitor devices M2 and M3 controls a single, different motor. That is, the motor control system 1 according to embodiment 3 includes three motors, not illustrated in FIG. 11.

In embodiment 3, each of the plurality of slave devices S of the motor control system 1 includes encoders and an output device. The encoders respectively correspond to the motor controllers (the master device M1 and the monitor devices M2 and M3). The output device corresponds to at least one of the motor controllers. In embodiment 3, the slave device S5 is a torque sensor to detect torque information of the motor controlled by the monitor device M3. The slave device S6 is an encoder to detect the rotational angle of the motor controlled by the monitor device M3. The slave device S7 is an encoder to detect the rotational angle of the motor controlled by the monitor device M2. The slave device S8 is an encoder to detect the rotational angle of the motor controlled by the master device M1.

While the slave devices S are connected in series to each other through the lower-level communication path 90 of a single system, the slave devices S5 and S6 output information to the monitor device M3, the slave device S7 outputs information to the monitor device M2, and the slave device S8 outputs information to the master device M1. In other words, the master device M1, the monitor devices M2 and M3, and the slave devices S are physically connected to each other through the lower-level communication path 90; the master device M1 and the slave device S8 are logically connected to each other; the monitor device M2 and the slave device S7 are logically connected to each other; and the monitor device M3 is logically connected to the slave devices S5 and S6.

The upper-level communication path 80 is connected to the upper-level communication port PA of the master device M1, which is the uppermost-level motor controller. The lower-level communication path 90 is connected to the lower-level communication port PB of the master device M1, which is the uppermost-level motor controller, and connects the monitor devices M2 and M3, which are lower-level motor controllers, in series to the plurality of slave devices S. Specifically, the upper-level communication port PA of the monitor device M2 is connected to the upper-level master device M1 through the lower-level communication path 90, and the lower-level communication port PB of the monitor device M2 is connected to the lower-level monitor device M3 through the lower-level communication path 90. The upper-level communication port PA of the monitor device M3 is connected to the upper-level monitor device M2 through the lower-level communication path 90, and the lower-level communication port PB of the monitor device M3 is connected to the uppermost-level slave device S5 through the lower-level communication path 90. The manner of connection of the slave devices S is as described in embodiment 2.

In embodiment 3, the plurality of motor controllers, namely, the master device M1 and the monitor devices M2 and M3 communicate with the plurality of slave devices S5 to S8. This communication method will be hereinafter referred to as M-to-N communication. M is an integer of equal to or more than two and indicates the number of the motor controllers included in the motor control system 1.

3-2. Functions Implemented in Motor Control System According to Embodiment 3

The master device M1 may be represented by functional blocks similar to the functional blocks illustrated in FIG. 3. The slave devices S may be represented by functional blocks similar to the functional blocks illustrated in FIG. 4. The monitor devices M2 and M3 are different in functional blocks from the master device M1.

Figure 12:
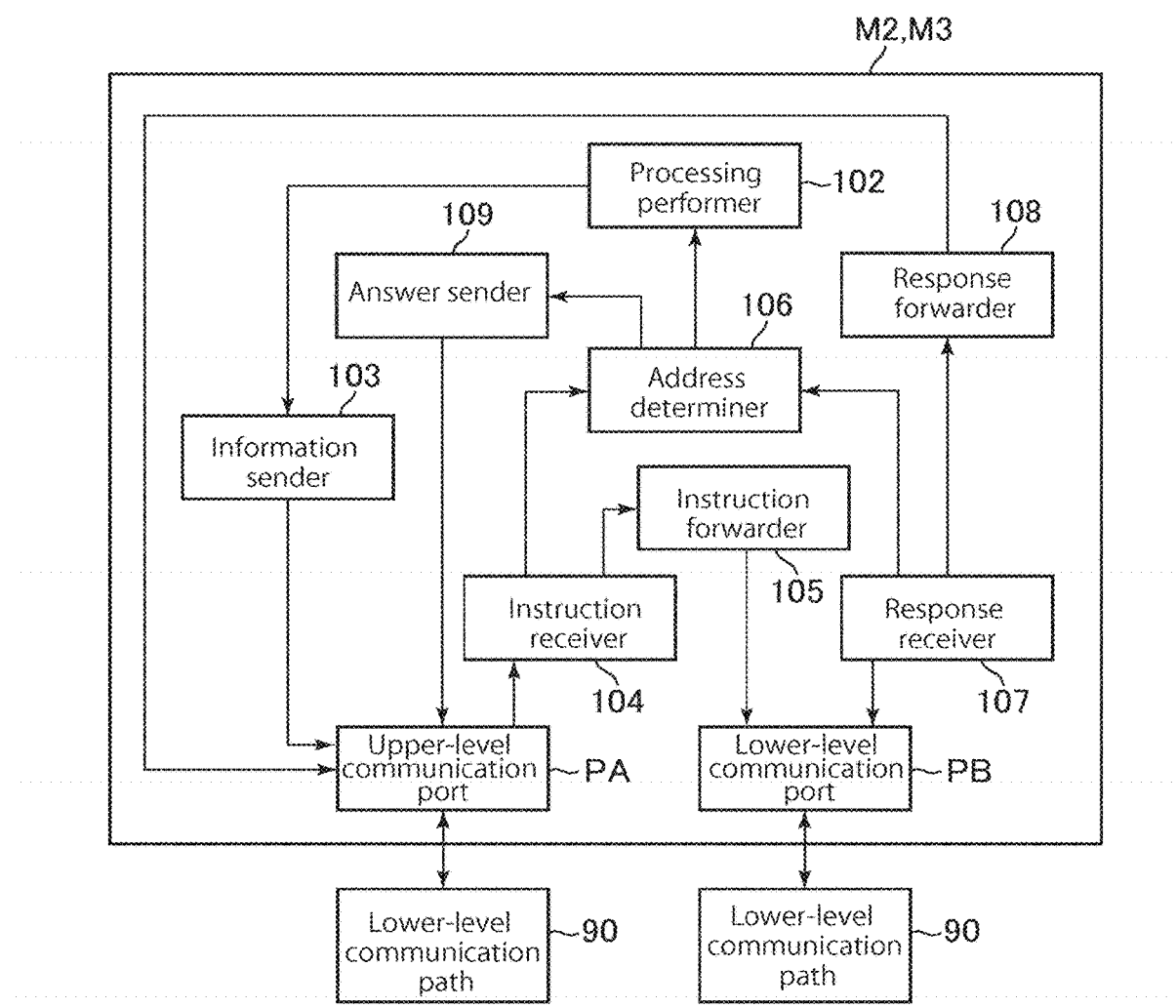
FIG. 12 is a functional block diagram of each of monitor devices.

FIG. 12 is a functional block diagram of each of the monitor devices M2 and M3. The functions of each of the monitor devices M2 and M3 include a processing performer 102, an information sender 103, an instruction receiver 104, an instruction forwarder 105, an address determiner 106, a response receiver 107, a response forwarder 108, and an answer sender 109. The monitor devices M2 and M3 do not send commands by themselves and thus include no instruction sender 100. In the following description, these functions will be detailed by referring to a flow of data sent and received in the motor control system 1, similarly to the flow of data described in embodiment 2.

Figure 13:
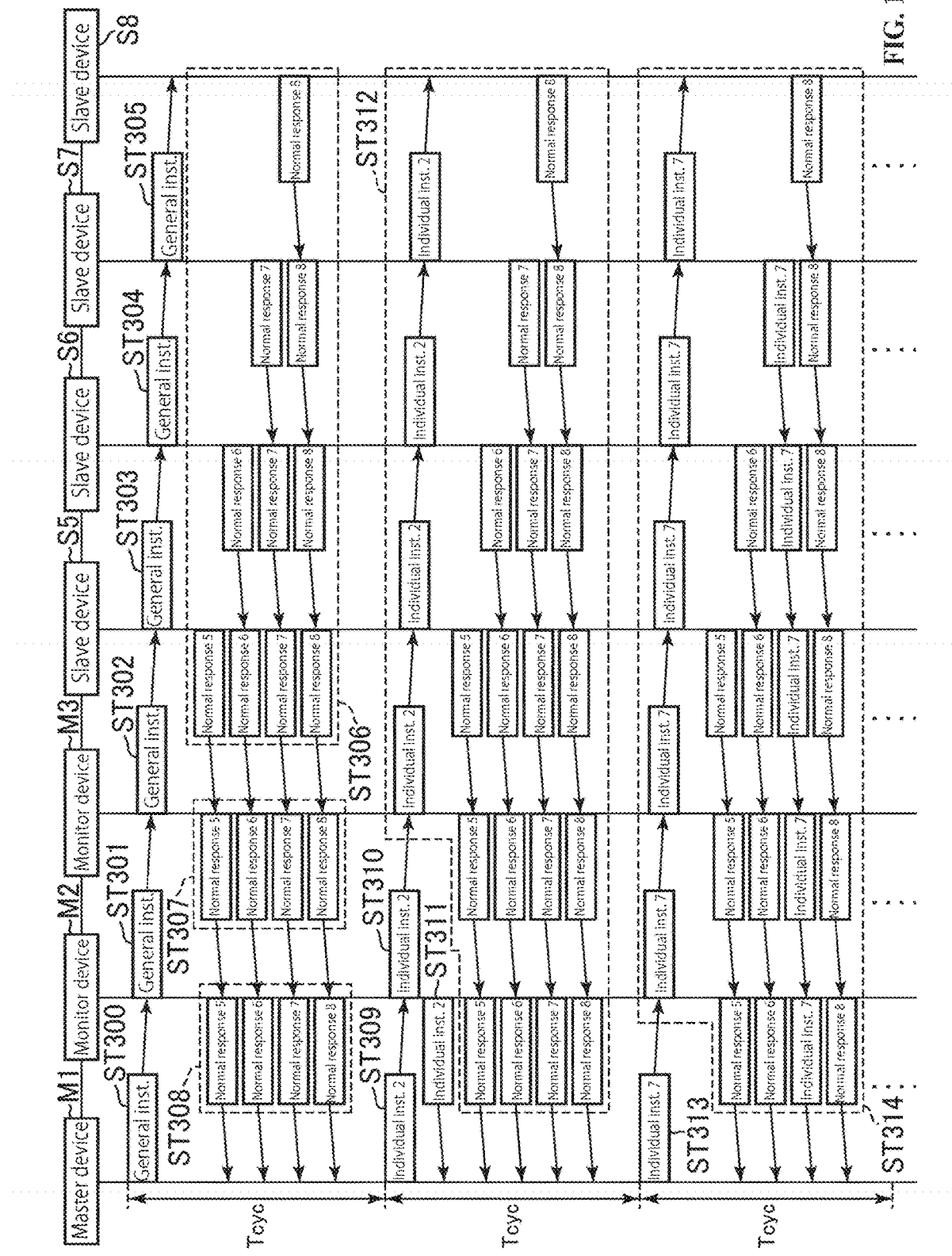
FIG. 13 illustrates an exemplary M-to-N communication.

FIG. 13 illustrates an exemplary M-to-N communication. As illustrated in FIG. 13, in a communication period $T_{cyc}$, the instruction sender 100 of the master device M1 sends a general instruction (step ST300). The general instruction may be similar in format to the general instruction according to embodiment 2. Each of the master device M1 and the monitor devices M2 and M3 stores in the each device's memory the address of the slave device S corresponding to the each device. Each of the slave devices S stores in the memory of the each slave device S the address of the master device M1 or the monitor device M2 or M3 corresponding to the each slave device S.

At the lower-level monitor device M2, when the instruction receiver 104 receives a general instruction from the upper-level communication port PA, the instruction forwarder 105 forwards the received general instruction from the lower-level communication port PB (step ST301). The function of the instruction receiver 104 may be similar to the function of the instruction receiver 200 of the slave device S, and the function of the instruction forwarder 105 may be similar to the function of the instruction forwarder 201 of the slave device S.

At the monitor device M2, when the instruction receiver 104 receives an instruction, the address determiner 106 determines whether the instruction contains the address of the monitor device M2. Since the general instruction contains the broadcast address instead of the address of the monitor device M2, the monitor device M2 illustrated in FIG. 13 returns no response to the general instruction. The monitor device M3 may be similar to the monitor device M2 in the processings of the instruction receiver 104, the instruction forwarder 105, and the address determiner 106.

At subsequent steps ST302 to ST305, the general instruction may be forwarded in a manner similar to steps ST2 to ST4 in embodiment 2. At step ST306, the slave devices S may send and forward normal responses in a manner similar to steps ST5 to ST14 in embodiment 2. It is noted, however, that each slave device S stores in the address A of its response the address of the master device M1 or the monitor device M2 or M3 corresponding to the each slave device S. The slave devices S5 and S6 store in their memories the address of the master device M1. The slave device S7 stores in its memory the address of the monitor device M2. The slave device S8 stores in its memory the address of the monitor device M3.

At the monitor device M3, when the response receiver 107 receives a response from the lower-level communication port PB, the response forwarder 108 forwards the response from the upper-level communication port PA (step ST307). Based on the source information of the received response, the address determiner 106 of the monitor device M3 determines whether the response should be taken in the monitor device M3. Specifically, the monitor device M3 stores in its memory 22 the addresses of the slave devices S5 and S6, which correspond to the monitor device M3. The address determiner 106 determines whether the addresses of the slave devices S5 and S6, which correspond to the monitor device M3, are stored in the source information. When the address determiner 106 determines that the addresses of the slave devices S5 and S6, which correspond to the monitor device M3, are stored in the source information, the address determiner 106 determines that this response is from the slave devices S5 and S6, and forwards the response to the processing performer 102. In the case of destination information being contained in the response from the slave device S, the address determiner 106 may determine whether the destination information indicates the address of the monitor device to which the address determiner 106 belongs to, and determine whether the response should be taken in the monitor device. The processings of the processing performer 102 and the information sender 103 are similar to the processings described in embodiment 2.

At step ST308, the monitor device M2 may be similar to the monitor device M3 in the processings of the address determiner 106, the response receiver 107, and the response forwarder 108. The processings performed after the master device M1 has received the response are similar to the processings described in embodiment 2.

The functions of the master device M1 and the monitor devices M2 and M3 will be further described by referring to a flow of an instruction sent by the master device M1 on behalf of the monitor device M2 in M-to-N communication. As illustrated in FIG. 13, the instruction sender 100 of the master device M1 sends an individual instruction to the lower-level monitor device M2 from the lower-level communication port PB so as to make an inquiry as to necessity of an instruction (step ST309). The format of the individual instruction may be similar to the format described in embodiment 2 (FIG. 6). For example, in the address A of the individual instruction, the address of the monitor device M2 is stored.

At the monitor device M2, the instruction receiver 104 receives the individual instruction from the upper-level communication port PA, and the instruction forwarder 105 forwards the received individual instruction (step ST310). At the monitor device M2, the address determiner 106 determines whether the address of the monitor device M2 is contained in the individual instruction. This individual instruction contains the address of the monitor device M2, and accordingly, the answer sender 109 of the monitor device M2 sends an individual response so as to answer the inquiry received through the lower-level communication path 90 (step ST311).

The individual response sent at step ST311 contains: information to determine whether an instruction to the slave device S7 is necessary; and information indicating the details of the instruction. The details of the instruction may be a command for the slave device S7 to execute or may be setting information to be written in the memory of the slave device S7. The method of determining the command and the method of determining the setting information may be similar to the methods in the one-to-one communication time described in embodiment 2. The answer sender 109 may determine whether an instruction is necessary based on a predetermined condition. Examples of the predetermined condition include, but are not limited to, whether a predetermined communication period has come, whether a predetermined period of time has elapsed since the previous instruction was sent, and whether the rotational angle received from the slave device S7 has a predetermined value. The answer sender 109 may not necessarily determine whether an instruction is necessary; instead, every time the answer sender 109 receives an inquiry from the master device M1, the answer sender 109 may make an answer informing that an instruction is necessary.

At the master device M1, when the response receiver 101 receives an answer, the instruction sender 100 determines, based on the received answer, whether to send an instruction on behalf of the monitor device M2. For example, the instruction sender 100 determines to send an instruction on behalf of the monitor device M2 when the answer contains information indicating that an instruction is necessary. The instruction sent on behalf of the monitor device M2 may be sent at or after the next communication period. At step ST312, the monitor device M3 and the slave device S may operate in a manner similar to steps ST302 to ST308.

When the next communication period $T_{cyc}$ has come, the instruction sender 100 of the master device M1 sends an individual instruction from the lower-level communication port PB based on the answer received through the lower-level communication path 90 on behalf of the monitor device M2 (step ST313). The individual instruction is addressed to the slave device S6, which corresponds to the lower-level monitor device M2. For example, the instruction sender 100 stores, as the destination of the instruction, the address of the slave device S6 in the address A of the instruction, and stores in the data DT1 the command contained in the answer and setting information. Then, the instruction sender 100 sends the instruction on behalf of the monitor device M2.

At subsequent step ST314, the individual instruction addressed to the slave device S6 is forwarded in a manner similar to the manner described in the one-to-one communication of embodiment 2. In the address A of the individual instruction, the address of the slave device S6 is stored. Accordingly, at the slave device S6, the address determiner 202 determines that the individual instruction is addressed to the slave device S6. Then, at the slave device S6, the command executor 203 executes the command contained in the instruction, stores the address of the monitor device M2 in the address A of the response, and sends the response with a result obtained by executing the command stored in the data DT2 of the response.

The master device M1 also makes an inquiry as to necessity of an instruction to the monitor device M3, similarly to the inquiry to the monitor device M3. Then, based on the answer received from the monitor device M3, the master device M1 sends an instruction to the slave device S5 or the slave device S6 on behalf of the monitor device M3. When the master device M1 sends an individual instruction to the slave device S8, which corresponds to the master device M1, the master device M1 sends the individual instruction in a manner similar to the manner described in the one-to-one communication of embodiment 2.

3-3. Processings Performed in Motor Control System

A flow of processings performed in the motor control system 1 will be described. The flow of the processings performed by the slave devices S is similar to the flow described in embodiment 2. The following description is concerning operations of the master device M1 and the monitor devices M2 and M3 performed after completion of initialization processing.

Figure 14:
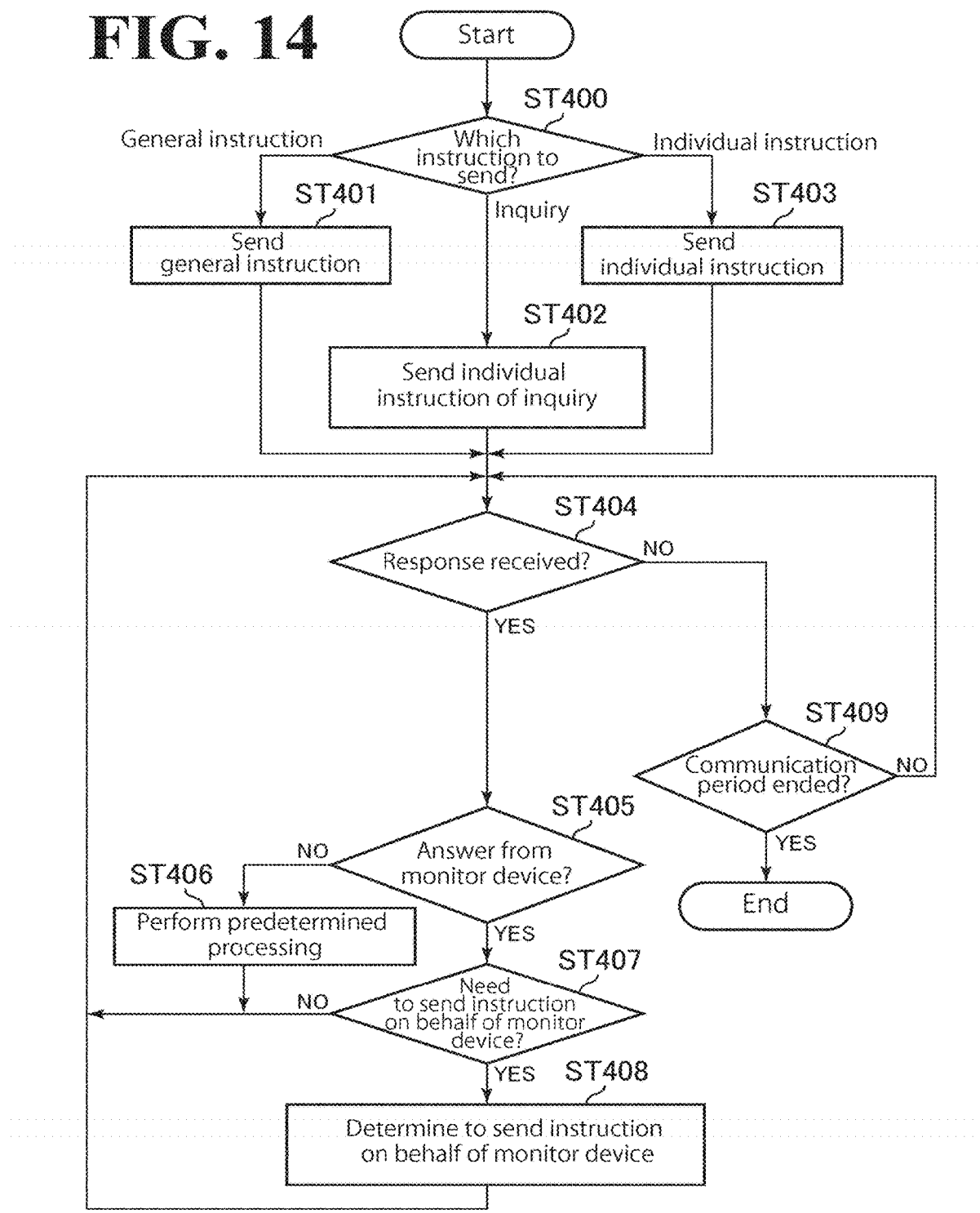
FIG. 14 is a flowchart of processings performed by the master device.

FIG. 14 is a flowchart of processings performed by the master device M1. As illustrated in FIG. 14, the instruction sender 100 chooses an instruction to send from a general instruction, an individual instruction making an inquiry to the monitor device M2 or M3, and an individual instruction to the slave device S (step ST400). The instruction sender 100 may choose an instruction to send based on a predetermined method. For example, the instruction sender 100 may periodically send to the monitor device M2 or M3 an inquiry as to necessity of an instruction, or send an individual instruction to the slave device S8 when the rotational angle received from the slave device S8 has a predetermined value. For further example, when the instruction sender 100 has received from the monitor device M2 or M3 an answer informing unnecessity of an instruction in the previous communication period, the instruction sender 100 may send a general instruction. For further example, when the instruction sender 100 has received from the monitor device M2 or M3 an answer informing necessity of an instruction in the previous communication period, the instruction sender 100 may send an individual instruction on behalf of the monitor device M2 or M3.

When at step ST400 the instruction sender 100 has chosen to send a general instruction (step ST400; general instruction), the processing at step ST401 may be similar to the processing at step ST101. When at step ST400 the instruction sender 100 has chosen to send an individual instruction of inquiry to the monitor device M2 or M3 (step ST400; inquiry), then the instruction sender 100 sends an individual instruction of inquiry to the monitor device M2 or M3 (step ST402). At step ST402, the instruction sender 100 sends an individual instruction that stores in its address A the address of the monitor device M2 or M3 to which the inquiry is made. It is possible to store no information in the data DT1 of the individual instruction or store in the data DT1 information to identify an inquiry as to necessity of an instruction.

When at step ST400 the instruction sender 100 has chosen to send an individual instruction to the slave device S8 (step ST401; individual instruction), the processing at step ST403 may be similar to the processing at step ST102. Subsequent steps ST404 and ST405 are respectively similar to steps ST103 and ST104. When at step ST405 the determination made by the address determiner 106 of the master device M1 is that the address of the master device M1 is stored in the response (step ST405; Yes), the address determiner 106 determines whether the answer is from the monitor devices M2 and M3 (step ST405). Specifically, at step ST405, the address determiner 106 determines whether the source information of the response is the address of the monitor devices M2 and M3.

When the determination made is that the answer is not from the monitor devices M2 and M3 (step ST405; No), the processing at step ST406 may be similar to the processing at step ST105. When the determination is that the answer is from the monitor device M2 or M3 (step ST405; Yes), the master device M1 refers to the answer so as to determine whether it is necessary to send an instruction on behalf of the monitor device M2 or M3 (step ST407). For example, information indicating necessity or unnecessity of an instruction is stored in the data DT1 of the response.

When the determination made at step ST407 is that it is necessary to send an instruction on behalf of the monitor device M2 or M3 (step ST407; Yes), the master device M1 determines to send an instruction on behalf of the monitor device M2 or M3 in the next communication period (step ST408). In this case, the instruction sender 100 may generate an individual instruction for the next communication period. For example, the instruction sender 100 identifies a destination slave device S to which the master device M1 is to send an instruction on behalf of the monitor device M2 or M3. The slave device S may be contained in the answer, or it is possible to identify the slave device S corresponding to the monitor device M2 or M3 by referring to source information contained in the answer. Step ST409 may be similar to step ST106.

Figure 15:
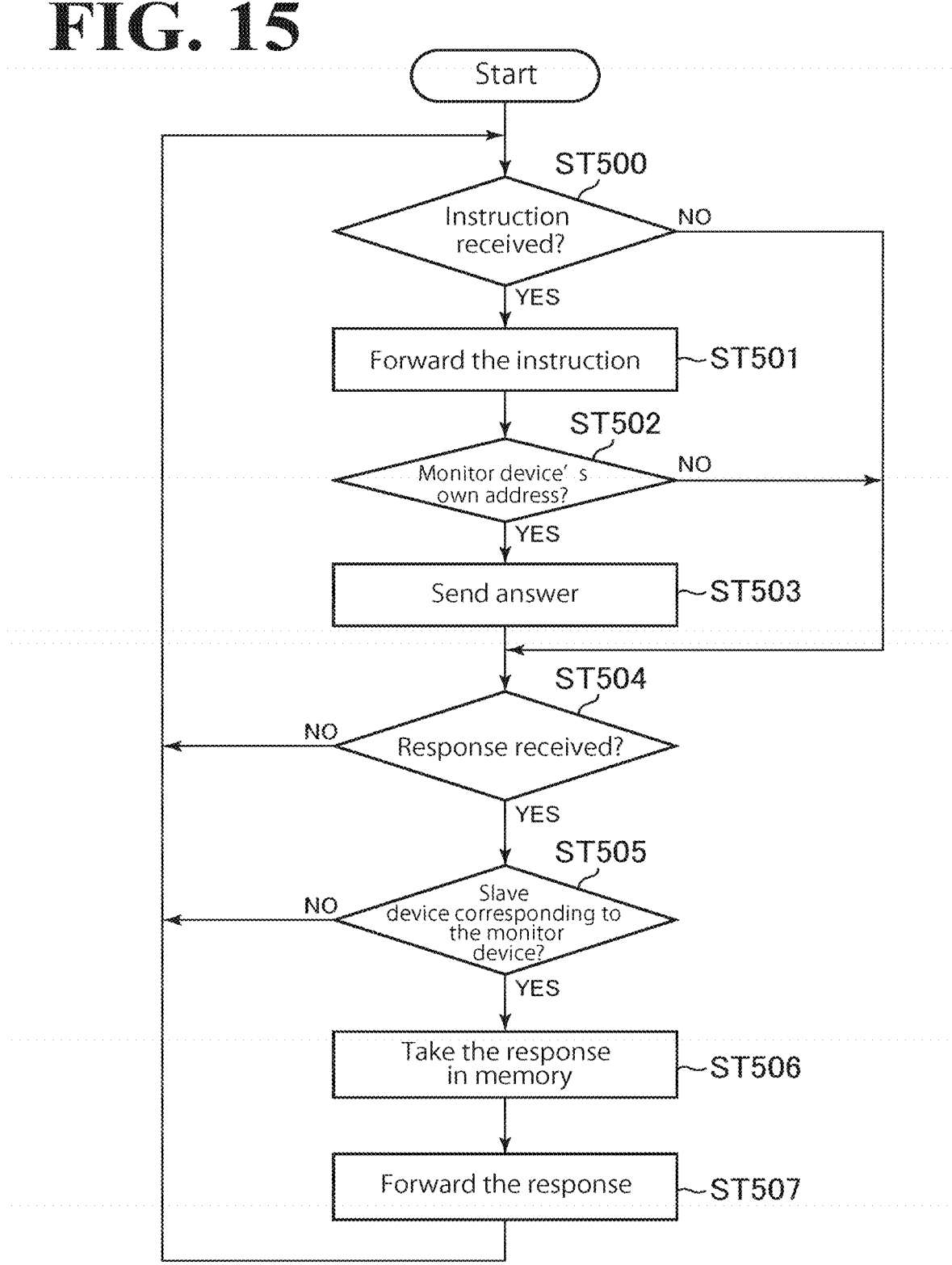
FIG. 15 is a flowchart of processings performed by the monitor.

FIG. 15 is a flowchart of processings performed by the monitor device M2. As illustrated in FIG. 15, the instruction receiver 104 determines whether an instruction has been received from the upper-level communication port PA (step ST500). When the determination made by the instruction receiver 104 is that an instruction has been received (step ST500; Yes), the instruction forwarder 105 forwards the received instruction from the lower-level communication port PB (step ST501).

The address determiner 106 determines whether the address of the monitor device M2 is stored in the address A of the received instruction (step ST502). When the address of the monitor device M2 is stored in the address A (step ST502; slave device S's own address), the answer sender 109 sends an answer as to necessity of an instruction from the upper-level communication port PA (step ST503). At step ST503, the answer sender 109 stores in the address A of the answer the address of the monitor device M2 as the source information, and stores in the address A of the answer the address of the master device M1 as the destination information. The details of the answer may be stored in the data DT2.

The response receiver 107 determines whether a response has been received from the lower-level communication port PB (step ST504). When the determination made by the response receiver 107 is that a response has been received (step ST504; Yes), the address determiner 106 determines whether the source information is the address of the slave device S7, which corresponds to the monitor device M2 (step ST505). When the determination made by the address determiner 106 is that the source information is the address of the slave device S7, which corresponds to the monitor device M2 (step ST505; Yes), the address determiner 106 takes the response in the memory 22 (step ST506).

The response forwarder 108 forwards the received response from the upper-level communication port PA (step ST507). When the determination made by the response receiver 107 is that no response has been received (step ST504; No), the processing at step ST500 is performed again.

In embodiment 3, the motor control system 1 includes a plurality of motor controllers, namely, the master device M1 and the monitor devices M2 and M3. The plurality of motor controllers are connected in series to each other through the lower-level communication path 90. This configuration minimizes the number of wires in the motor control system 1. Also, the slave devices S are connected in series to each other through the lower-level communication path 90. With this configuration, each of the master device M1 and the monitor devices M2 and M3 not only receives a response from a slave device S corresponding to the master or monitor device but also receives responses from slave devices S not corresponding to the master or monitor device. Still, by referring to the address A of each response, the master or monitor device identifies a response from the slave device S corresponding to the master or monitor device, and performs a predetermined processing based on the identified response.

Also in embodiment 3, the uppermost-level master device M1 is capable of sending an instruction on behalf of the lower-level monitor devices M2 and M3. In this manner, the uppermost-level master device M1 manages instructions in the motor control system 1. For example, if the lower-level monitor devices M2 and M3 were allowed to send instructions by their own decision, the lower-level monitor devices M2 and M3 might be congested with responses and might not be able to receive responses within one communication period. Embodiment 3 eliminates or minimizes such situation, since the uppermost-level master device M1 manages instructions of the lower-level monitor devices M2 and M3.

4. Embodiment 4

According to the inventors' knowledge and experience, slave devices connected in series to each other on a lower-level communication path can be prioritized according to importance of information that they handle; highly prioritized slave devices handle information that is needed more frequently, while less prioritized slave devices handle information that is needed less frequently. For example, a robot system is a motor control system that generally needs to use a large number of sensors. In the robot system, a larger difference of importance is likely between slave devices for the sensors. If all the slave devices have the same data transmission periods, information of higher importance may be obtained less frequently, or information of lower importance may be obtained more frequently, increasing the communication traffic volume. As a result of studies conducted by the inventors in an attempt to assign each slave device a unique period instead of setting the same period to all the slave devices, the inventors conceived of a novel and unique motor control system and associated apparatuses and/or devices. A motor control system and associated apparatuses and/or devices according to embodiment 4 will be described in detail below.

Figure 16:
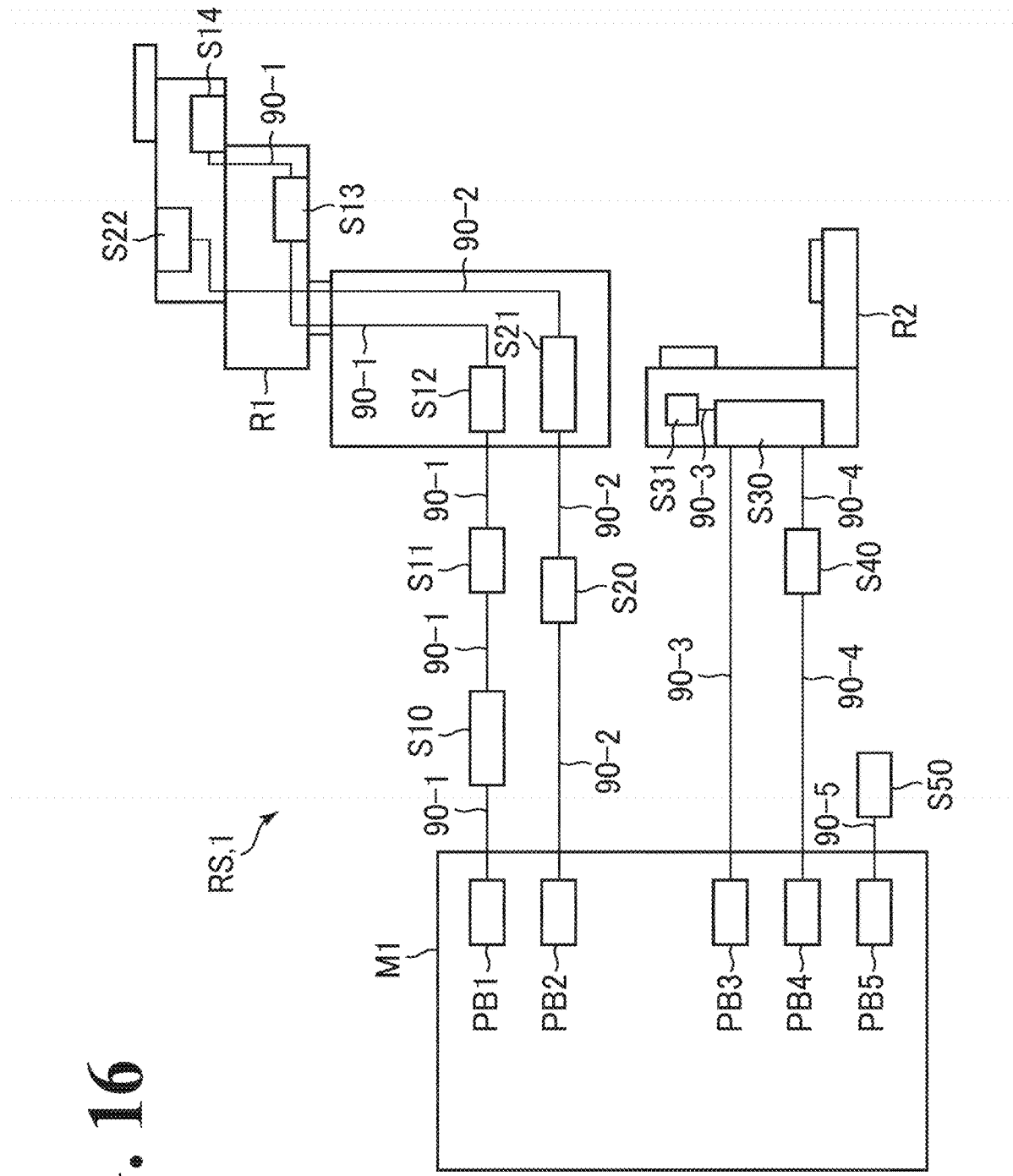
FIG. 16 is a diagram of an exemplary robot system.

In embodiment 4, the motor control system 1 is applied to a robot system. FIG. 16 is a diagram of an exemplary robot system RS. As illustrated in FIG. 16, the robot system RS includes the motor control system 1 and robots R1 and R2. The motor control system 1 according to embodiment 4 includes a single master device M1.

The master device M1 includes a plurality of lower-level communication ports PB1 to PB5 (hereinafter collectively referred to as lower-level communication port PB or lower-level communication ports PB) and lower-level communication paths 90-1 to 90-5 of a plurality of channels (the lower-level communication paths 90-1 to 90-5 will be hereinafter collectively referred to as lower-level communication path 90 or lower-level communication paths 90). On some lower-level communication paths 90, a plurality of slave devices S are connected in series to each other, similarly to embodiments 1 to 3. On other lower-level communication paths 90, there is a single slave device S, such as a slave device S50 on the lower-level communication path 90-5.

In embodiment 4, the robot R1 includes three motors and the robot R2 includes a single motor.

On the lower-level communication path 90-1, slave devices S10 to S14 are connected in series to each other. The slave devices S10 to S14 are not encoders but output devices such as an I/O device and an AD device. That is, the lower-level communication path 90-1 can be regarded as a communication path for output devices. Thus, the motor control system 1 may include a lower-level communication path without encoders, such as the lower-level communication path 90-1, that is, only output devices may be connected in series to each other.

On the lower-level communication path 90-2, slave devices S20 to S22 are connected in series to each other. The slave device S20 is an input-output (I/O) device, and the slave device S21 includes encoders to detect rotational angles of the motors included in the robot R1. Since in embodiment 4 the robot R1 includes three motors, the slave device S21 includes three encoders. The slave device S22 includes a plurality of sensors such as an acceleration sensor and an angle acceleration sensor.

On the lower-level communication path 90-3, slave devices S30 to S31 are connected in series to each other. The slave device S30 is an I/O device, and the slave device S31 is an encoder to detect rotational angle of the motor included in the robot R2. On the lower-level communication path 90-4, a slave device S40 and a slave device S30 are connected in series to each other. The slave device S40 is an I/O device or an AD device. The lower-level communication path 90-4 includes no encoders, similarly to the lower-level communication path 90-1, and can be regarded as a communication path for output devices.

In embodiments 1 to 3, the slave devices S have the same data exchange periods. In embodiment 4, the slave devices S have different data exchange periods. For example, information of higher importance such as rotational angle of a motor has a shorter data exchange period so that information of higher importance is more frequently sent to the master device M1. In contrast, a longer data exchange period is set to those kinds of information that need not be sent to the master device M1 as frequently. A non-limiting example of such information is temperature that a temperature sensor connected to an I/O device detects.

Embodiment 4 may be represented by functional blocks similar to the functional blocks described in embodiments 2 and 3. For example, embodiment 4 is similar to embodiments 2 and 3 in that the response sender 204 of each slave device S sends a response in response to an instruction received by the instruction receiver 200. In embodiment 4, the response sender 204 of each slave device S sends rotational angle or associated information for a data exchange period different from the data exchange period of at least one other slave device S. That is, a plurality of data exchange periods coexist on a lower-level communication path 90. The data exchange period of each slave device S is stored in advance in each slave device S's memory. The response sender 204 of each slave device S sends rotational angle or output information in every data exchange period of the slave device S.

For example, the response sender 204 of each slave device S may send a response that contains rotational angle or associated information at a sending timing determined based on the sending timing of the response sender 204 of another slave device S. In this case, the response sender 204 of each slave device S uses the communication period counter CT contained in the instruction as a basis for determining when is the sending timing to send a response. Each slave device S is assigned a unique sending timing for response, and the response sender 204 sends a response when the value indicated by the communication period counter CT is the value corresponding to the slave device S's sending timing.

Functions of the response sender 204 according to embodiment 4 will be described below by referring to data exchange periods on the lower-level communication paths 90-1 to 90-4.

Figure 17:
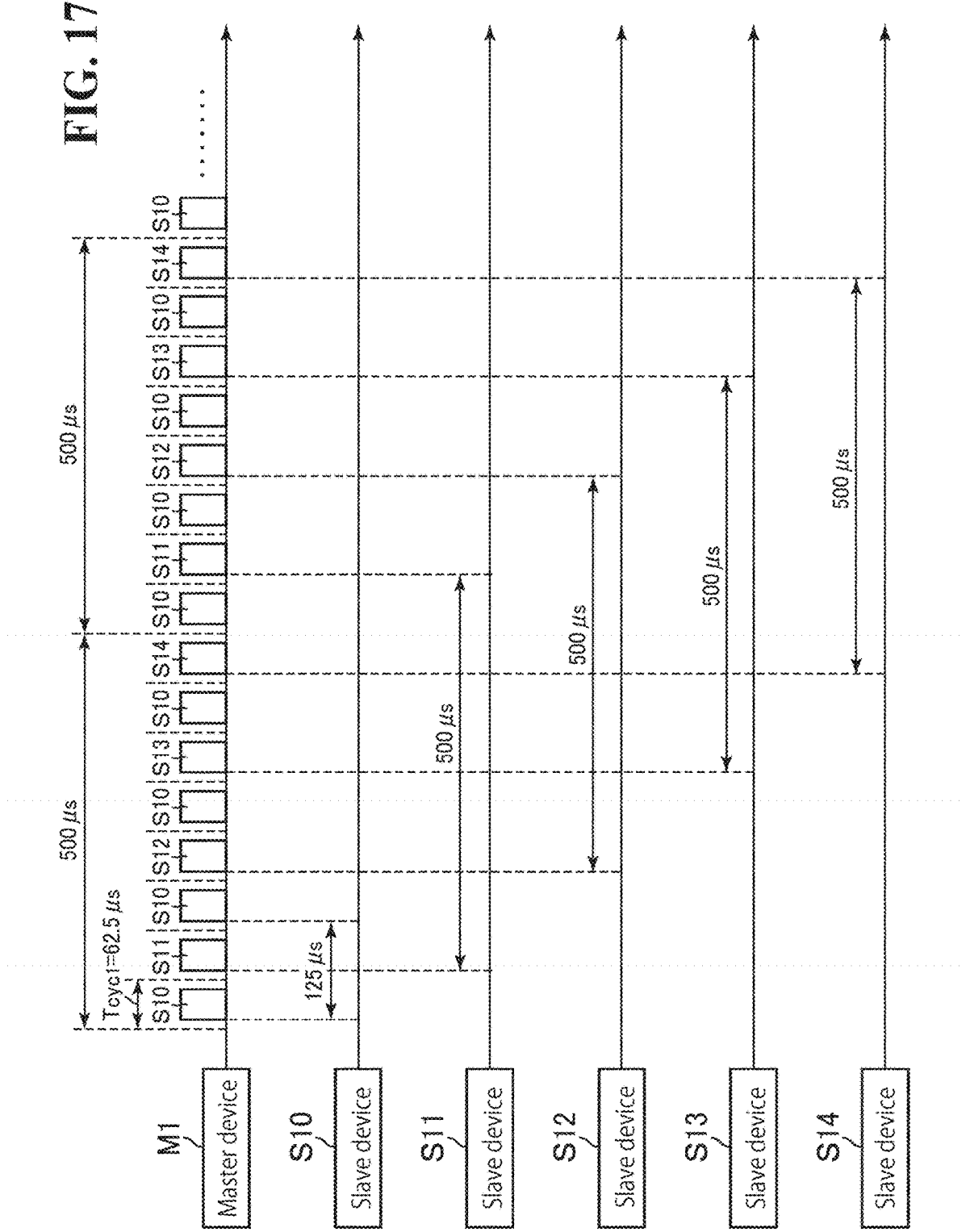
FIG. 17 illustrates data exchange periods on a lower-level communication path.

FIG. 17 illustrates data exchange periods on the lower-level communication path 90-1. As illustrated in FIG. 17, the data exchange period of the slave device S10 on the lower-level communication path 90-1 is 125 µs, and the data exchange periods of the slave devices S11 to S14 are 500 µs. The lower-level communication path 90-1 is assigned a communication period $T_{cyc1}$ of 62.5 µs. In every communication period $T_{cyc1}$, the instruction sender 100 of the master device M1 sends a general instruction, which is not illustrated in FIG. 17.

On the lower-level communication path 90-1, the response sender 204 of one slave device S sends a response in every communication period $T_{cyc1}$. Which slave device S sends a response in which communication period $T_{cyc1}$ is determined in advance. Specifically, eight periods make up one cycle (500 μs), and the response sender 204 of the slave device S10 sends a response in the first period, the third period, the fifth period, and the seventh period. In the rest of the periods, the response senders 204 of other slave devices S send responses. Specifically, the response sender 204 of the slave device S11 sends a response in the second period; the response sender 204 of the slave device S12 sends a response in the fourth period; the response sender 204 of the slave device S13 sends a response in the sixth period; and the response sender 204 of the slave device S14 sends a response in the eighth period. In the subsequent cycles, responses are sent according to this order, starting from the first period.

In the memory of each slave device S, sending timing information to identify the sending timing for response is stored, as described above. Based on the sending timing information, the response sender 204 of each slave device S determines when is the sending timing for the slave device S to send a response. When the response sender 204 of each slave device S determines that the current period is the sending timing for the slave device S to send a response, the response sender 204 sends the response. For example, the sending timing information may specify the period in which to send a response. For further example, the sending timing information may specify for how many micro-seconds after the start time point of one cycle the slave device S waits before sending a response. In this case, the response sender 204 of each slave device S uses the communication period counter CT contained in the instruction and the sending timing information as a basis for determining when is the sending timing for the slave device S to send a response.

For example, the response sender 204 of the slave device S10 determines whether the current period of a cycle is the first period, the third period, the fifth period, or the seventh period based on the sending timing information of the slave device S10 and based on the communication period counter CT. When the response sender 204 determines that the current period is any of the above-described periods, the response sender 204 determines that the current period is the sending timing for the slave device S10 to send a response. The response sender 204 of the slave device S11 determines whether the current period of a cycle is the second period based on the sending timing information of the slave device S11 and based on the communication period counter CT. The response sender 204 of the slave device S12 determines whether the current period of a cycle is the fourth period based on the sending timing information of the slave device S12 and based on the communication period counter CT. The response sender 204 of the slave device S13 determines whether the current period of a cycle is the sixth period based on the sending timing information of the slave device S13 and based on the communication period counter CT. The response sender 204 of the slave device S14 determines whether the current period of a cycle is the eighth period based on the sending timing information of the slave device S14 and based on the communication period counter CT. When the response sender 204 of any of the slave devices S10 to S14 determines that the current period is not the sending timing for the slave device S to send a response, the response sender 204 does not send a response. When the response sender 204 determines that the current period is the sending timing for the slave device S to send a response, the response sender 204 sends a normal response that contains rotational angle and associated information.

Figure 18:
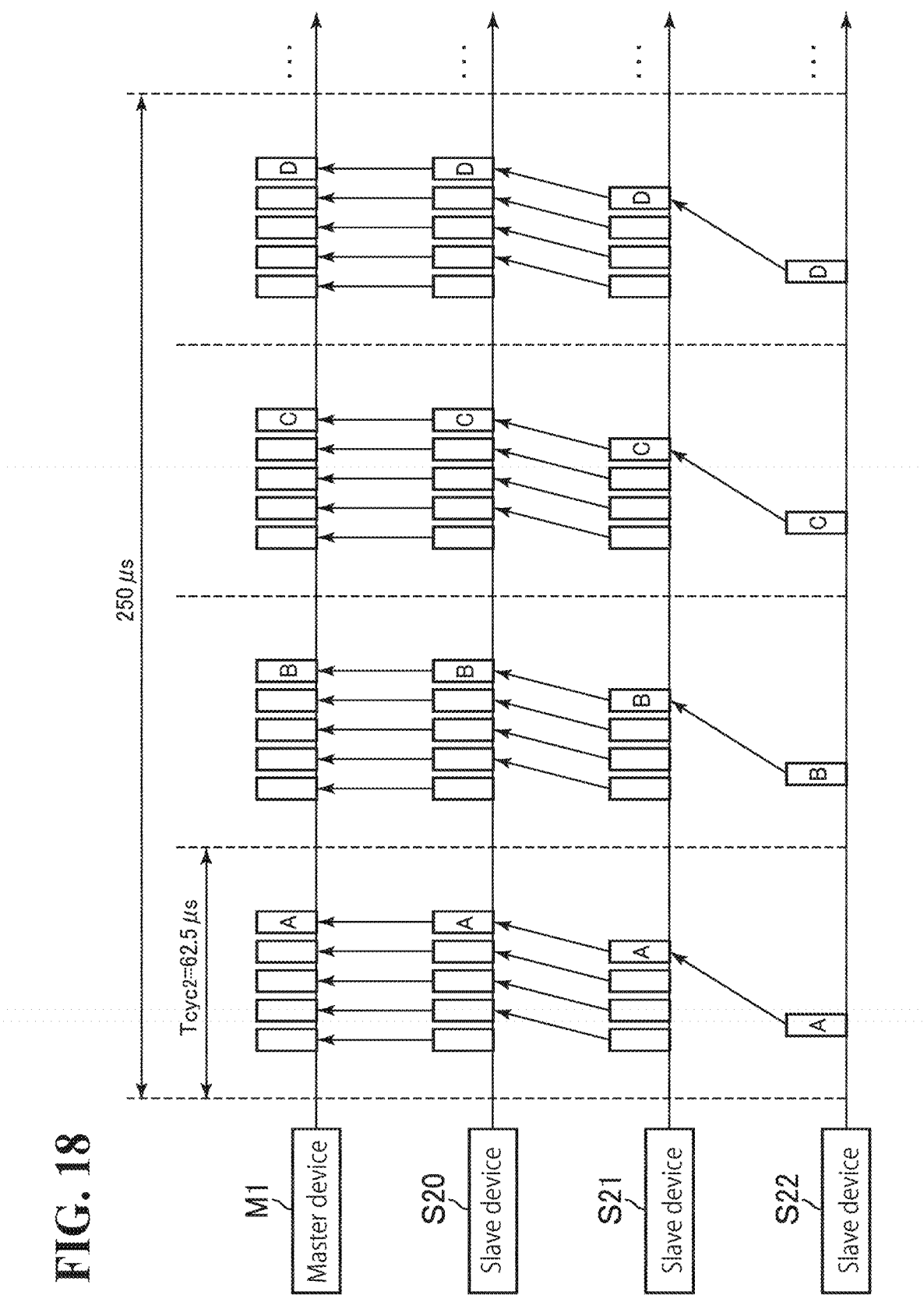
FIG. 18 illustrates data exchange periods on the lower-level communication path.

FIG. 18 illustrates data exchange periods on the lower-level communication path 90-2. As illustrated in FIG. 18, on the lower-level communication path 90-2, the data exchange periods of the slave devices S20 to S22 is 62.5 μs. The slave device S22 sends one of four different kinds of data in every data exchange period. Since the communication period on the lower-level communication path 90-2 is 62.5 μs and the slave device S22 sends one kind of data in every communication period $T_{cyc2}$, the actual data exchange period of the slave device S22 is four times $T_{cyc2}$, that is, 250 μs.

On the lower-level communication path 90-2, the response sender 204 of each slave device S sends a response in one communication period $T_{cyc2}$. For example, the sending timing information of each slave device S may specify that a response be sent in every communication period $T_{cyc2}$. Alternatively, each slave device S may not necessarily store sending timing information, and the response sender 204 of each slave device S may send a response every time an instruction is received. Since the slave device S21 includes three encoders, the slave device S21 sends three responses indicating three rotational angles.

As described above, the response sender 204 of the slave device S22 sends one of four different kinds of data in every communication period $T_{cyc2}$. Which kind of data is sent in which communication period $T_{cyc2}$ may be determined in advance. Under the assumption that four communication periods $T_{cyc2}$ make up one cycle, the response sender 204 of the slave device S22 sends four kinds of data in a predetermined order in one cycle. The sending timing information may specify which kind of data be sent in which communication period $T_{cyc2}$. Based on the sending timing information, the response sender 204 of the slave device S22 identifies data to send in the current communication period $T_{cyc2}$, and sends a response that contains the data.

As illustrated in FIG. 18, the response sender 204 of the slave device S22 is capable of sending four kinds of data, namely, data A, data B, data C, and data D. Here, the sending timing information specifies that the response sender 204 send data A in the first period of a cycle, send data B in the second period, send data C in the third period, and send data D in the fourth period. The response sender 204 refers to the communication period counter CT contained in the instruction so as to identify the kind of data that can be sent in the current period send. Then, the response sender 204 sends the identified kind of data.

Figure 19:
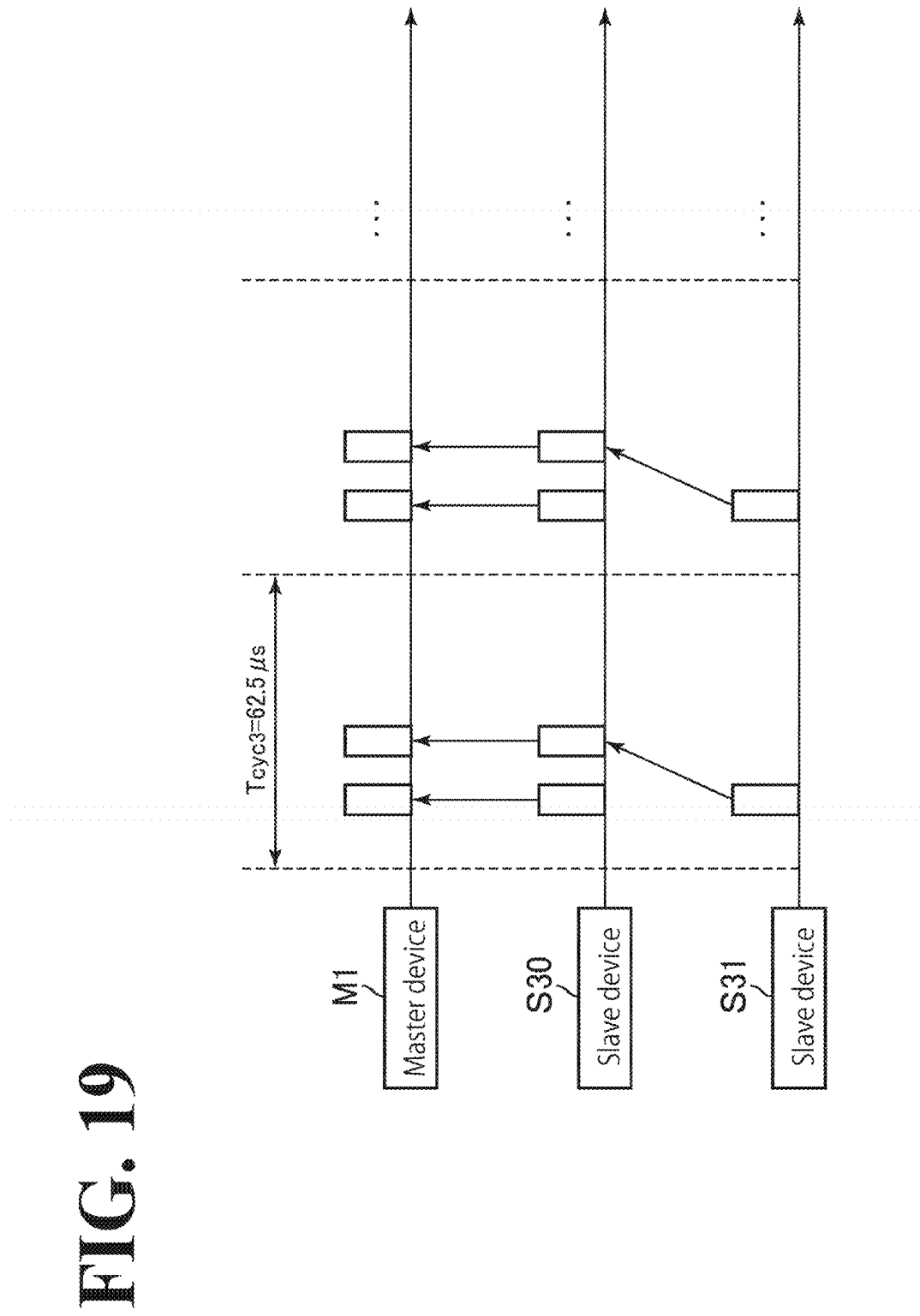
FIG. 19 illustrates data exchange periods on the lower-level communication path.

FIG. 19 illustrates data exchange periods on the lower-level communication path 90-3. As illustrated in FIG. 19, on the lower-level communication path 90-3, the data exchange periods of the slave devices S30 and S31 are 62.5 μs. Thus, slave devices S of the same data exchange periods may coexist on the lower-level communication path 90. As illustrated in FIG. 19, the lower-level communication path 90-3 is assigned a communication period $T_{cyc3}$ of 62.5 μs, which is the same as the data exchange period. Accordingly, the slave devices S30 and S31 send a response in every communication period $T_{cyc3}$. In this case, the processings performed by the response sender 204 may be similar to the processings performed by the response sender 204 described in embodiments 2 and 3.

Figure 20:
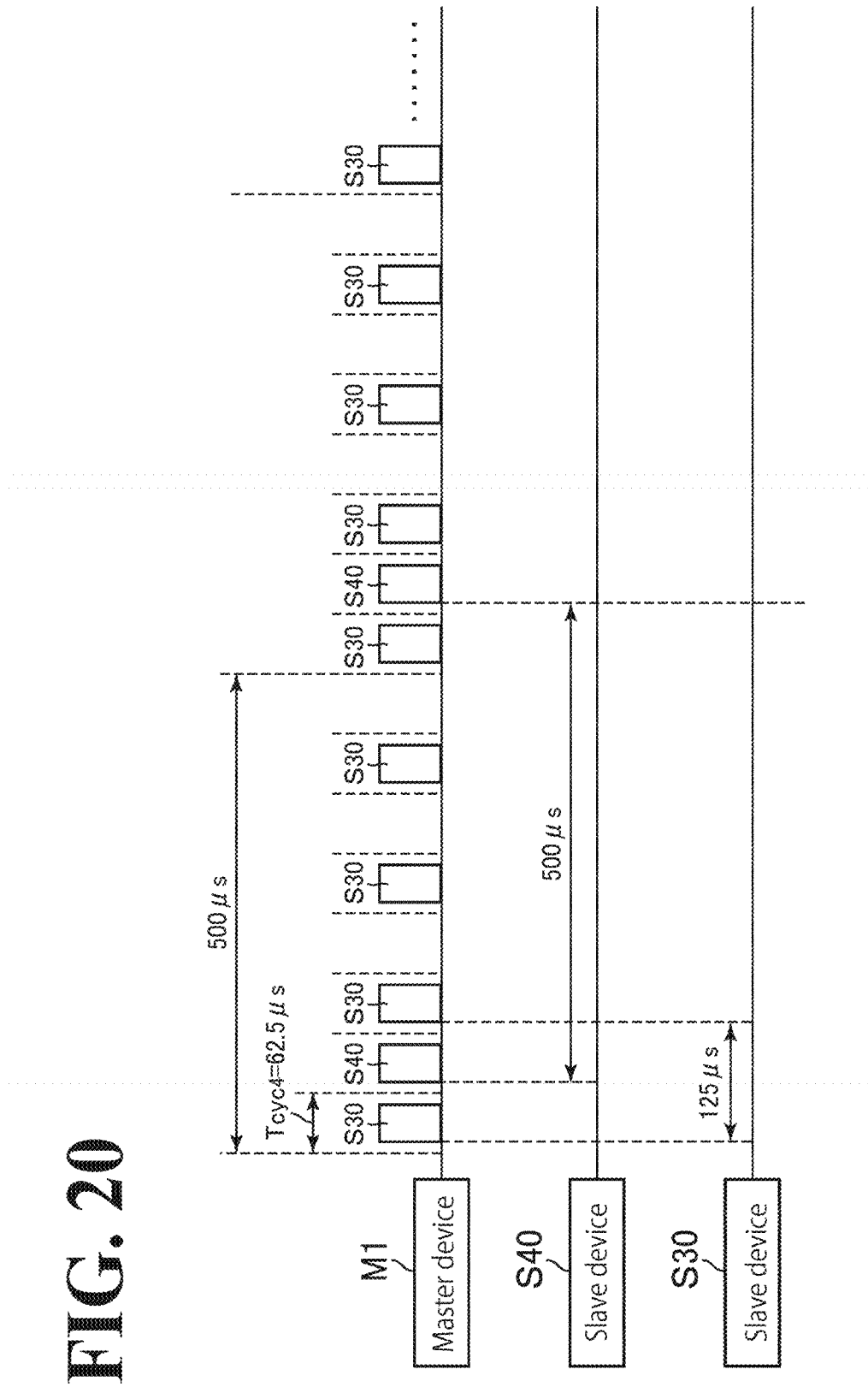
FIG. 20 illustrates data exchange periods on the lower-level communication path.

FIG. 20 illustrates data exchange periods on the lower-level communication path 90-4. As illustrated in FIG. 20, on the lower-level communication path 90-4, the data exchange period of the slave device S40 is 500 µs, and the data exchange period of the slave device S30 is 125 µs. The lower-level communication path 90-4 is assigned a communication period $T_{cyc4}$ of 62.5 µs. Thus, depending on the system of the lower-level communication path 90, slave devices S of different data transmission periods may be included.

On the lower-level communication path 90-4, there are communication periods $T_{cyc4}$ in which no slave devices S return a response. For example, under the assumption that eight periods make up one cycle, the fourth period, the sixth period, and the eighth period are periods in which no slave devices S on the lower-level communication path 90-4 return a response. For example, in the first period, the third period, the fifth period, and the seventh period of a cycle, the response sender 204 of the slave device S41 sends a response, while in the second period, the response sender 204 of the slave device S40 sends a response.

The lower-level communication path 90-4 is similar to the lower-level communication paths 90-1 to 90-3 in that sending timing information to identify the sending timing for response may be stored in the memory of each slave device S. For example, the response sender 204 of the slave device S40 determines whether the current period of a cycle is the second period based on the sending timing information of the slave device S40 and based on the communication period counter CT. When the response sender 204 determines that the current period is the second period, the response sender 204 determines that the current period is the sending timing for the slave device S40 to send a response. The response sender 204 of the slave device S41 determines whether the current period of a cycle is the first period, the third period, the fifth period, or the seventh period based on the sending timing information of the slave device S and based on the communication period counter CT.

In embodiment 4, each slave device S is assigned a unique data transmission period, instead of using the data transmission period for all the slave devices S. For example, those kinds of information, such as rotational angle, that need to be sent to the master device M1 more frequently are sent in shorter data transmission periods, while those kinds of information that need not be sent to the master device M1 as frequently are sent in longer data transmission periods. Thus, a period is set according to the degree of importance of information. As a result, the communication traffic volume on the lower-level communication path 90 is reduced.

If sending timings to send information such as rotational angles of the slave devices S concentrate in a particular length of time, information of slave devices S that are assigned shorter periods might not be received. Embodiment 4 minimizes such situation by determining the sending timing of a slave device S based on the sending timing of another device.

In embodiment 4, the motor control system 1 is applied to a robot system, RS. Robot systems use a large number of sensors, and applying the motor control system 1 to a robot system reduces physical costs and/or processing costs.

In embodiment 4, the longest data transmission period may be an integral multiple of the shortest data transmission period. The start time point of the longest data transmission period may match the start time point of the shortest data transmission period. While the data transmission period may be set at any convenient length, if sending timings of data concentrate on one time point, responses might not be received within one communication period. In view of this, the sending timings of the slave devices S may be shifted from each other so as to keep the volume of data at or below a volume sendable within one communication period.

5. Embodiment 5

According to the inventors' knowledge and experience, slave devices connected in series to each other on a lower-level communication path vary in data size of information that they output; some slave devices output a larger size of information, while other devices output a smaller size of information. However, as long as the data sections of the responses of all the slave devices have the same data lengths, the data length that occupies the transmission frame of a response as a whole remains unchanged regardless of whether the data size is larger or smaller. That is, when information of smaller data size is contained in a response, an unused area is left in the data section and makes the entire data length larger than the actual data size, resulting in an increase in the communication traffic volume on the lower-level communication path. As a result of studies conducted by the inventors in an attempt to send a response of a data length determined based on a slave device, the inventors conceived of a novel and unique motor control system and associated apparatuses and/or devices. A motor control system and associated apparatuses and/or devices according to embodiment 5 will be described in detail below.

The form of communication in the motor control system 1 according to embodiment 5 may be one-to-N communication, described in embodiment 2, or M-to-N communication, described in embodiment 3. As described in embodiment 4, the motor control system 1 may be applied to the robot system RS. For simplicity of description, the following description of embodiment 5 will be concerning a single master device M1 communicating with a plurality of slave devices S. In embodiment 5, the master device M1 has a physical configuration similar to the corresponding physical configurations described in the embodiments 1 to 3, whereas each slave device S has a physical configuration different from the corresponding physical configurations described in embodiments 1 to 3.

Figure 21:
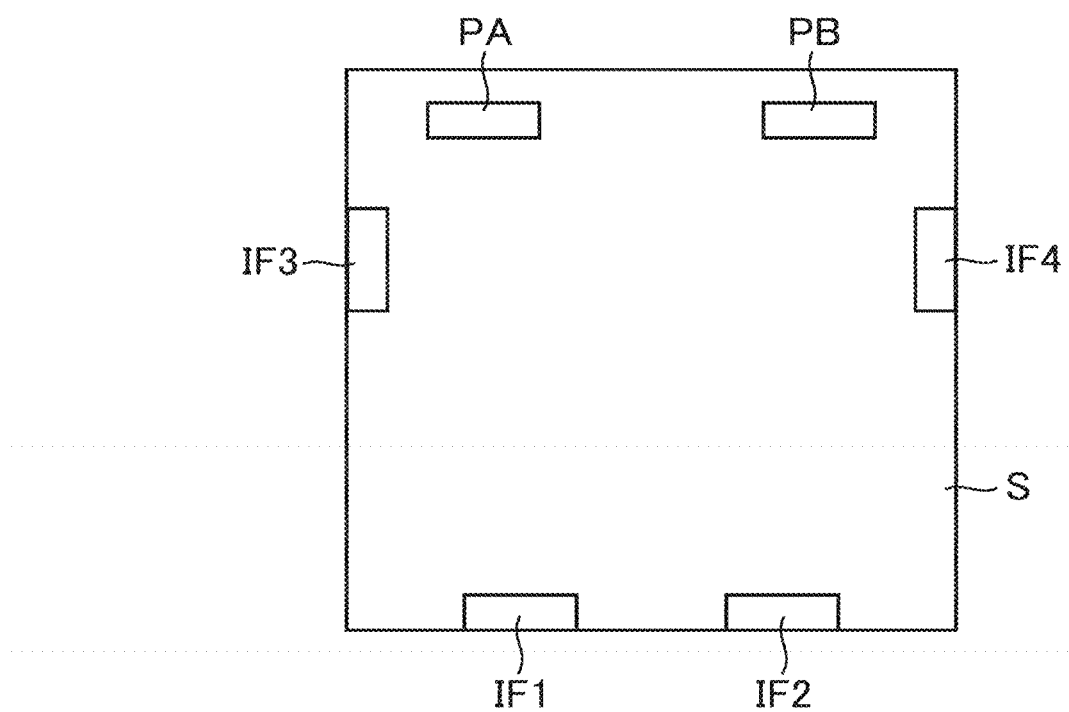
FIG. 21 illustrates a physical configuration of a slave device according to embodiment 5.

FIG. 21 illustrates a physical configuration of each slave device S according to embodiment 5. As illustrated in FIG. 21, the slave device S includes a plurality of interfaces IF1 to IF4 (hereinafter collectively referred to as interface IF or interfaces IF). To the interface IF, a sensor to detect rotational angle or associated information is connected. For example, when the slave device S illustrated in FIG. 21 is an encoder, this encoder includes a plurality of interfaces IF. That is, each slave device S according to embodiment 5 functions as an encoder or a torque sensor as well as functioning as an I/O device.

The interfaces IF1 and IF2 are AD devices. The interfaces IF3 and IF4 are interfaces capable of making serial communication. To each interface IF, an output device to detect output information is connected. This configuration enables the slave device S, which is an encoder in embodiment 5, to obtain not only rotational angle but also any other kinds of information that correspond to the output devices connected to the interfaces IF.

Each slave device S is capable of activating or inactivating each individual interface IF. The slave device S may obtain associated information from an output device connected to an active interface IF, and may not necessarily obtain associated information from an output device connected to an inactive interface IF. Whether the interface IF is active or inactive may be checked by referring to setting information contained in the instruction from the master device M1. This configuration enables the master device M1 to activate or inactivate the slave device S by sending individual instruction to the slave device S.

In embodiment 5, the sizes of data are correlated to corresponding interfaces IF that obtain the data. This relationship between the interface IF and data size may be stored in advance in the memory of the slave device S. The data sizes acceptable may be common throughout the interfaces IF or may vary from interface IF to interface IF. For example, the interfaces IF1 and IF2 may accept two bytes of data, and the interfaces IF3 and IF4 may accept four bytes of data. The data sizes correlated to the interfaces IF may vary depending the kinds of the output devices connected to the interfaces IF.

Next, functions of the motor control system 1 according to embodiment 5 will be described. The master device M1 according to embodiment 5 may be represented by functional blocks similar to the functional blocks of the master device M1 described in any of embodiments 2 to 4. A difference is that the instruction sender 100 of the master device M1 sends from the lower-level communication port an instruction to identify the interface from which the slave device S outputs information. For example, the instruction sender 100 stores a command to activate or inactivate the interfaces IF of each slave device S in the data DT1 of the individual instruction addressed to the slave device S. Specifically, the command specifies whether each of the interfaces IF of the slave devices S is active or inactive.

The master device M1, at any convenient timing, sends an individual instruction with the command to activate or inactivate the interfaces IF. For example, at the initialization timing, the master device M1 may send to the slave device S an individual instruction with the command to activate or inactivate the interfaces IF.

Figure 22:
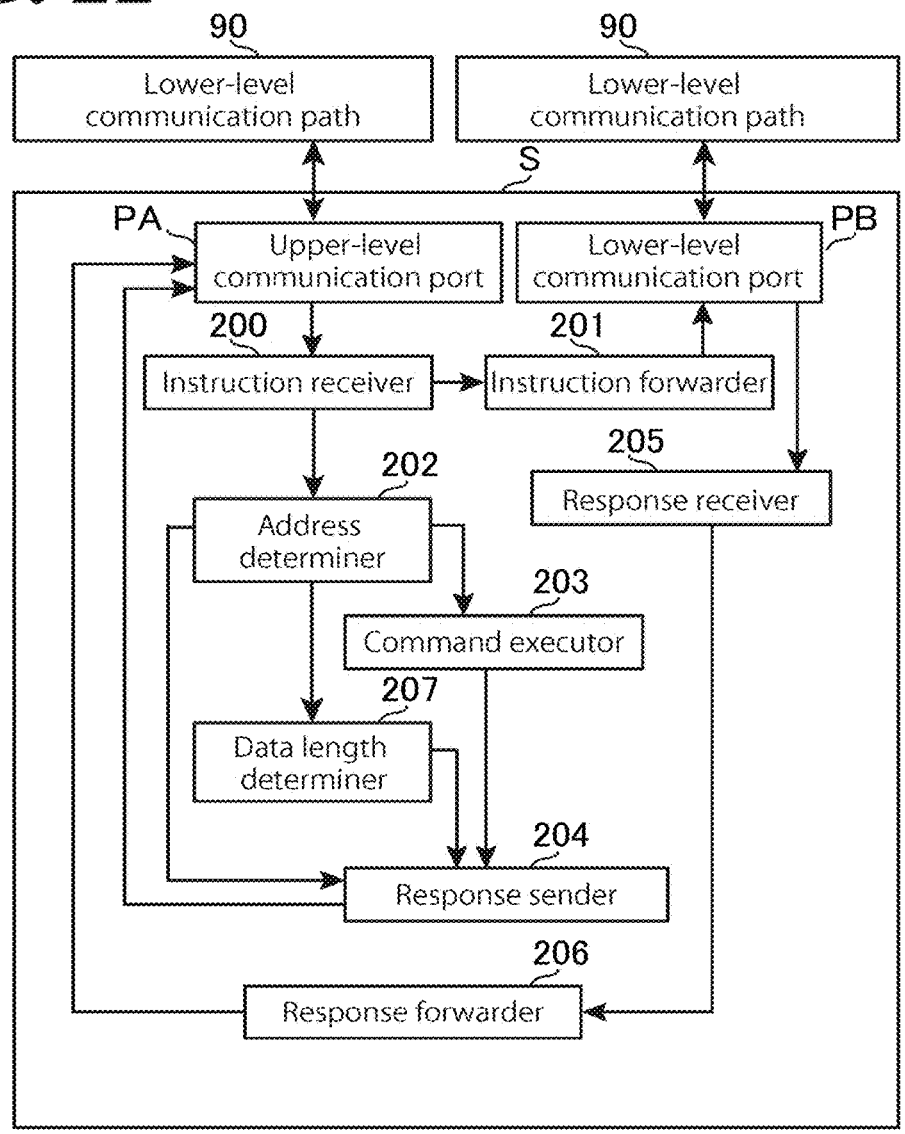
FIG. 22 is functional block diagram of the slave device according to embodiment 5.

FIG. 22 is a functional block diagram of the slave device S according to embodiment 5. As illustrated in FIG. 22, the slave device S implements a data length determiner 207. The data length determiner 207 determines the data length of the response of the slave device S based on the interface IF specified by the individual instruction received through the lower-level communication path 90. For example, the data length determiner 207 changes the data length of the response based on the interface IF indicated as active in the individual instruction. In embodiment 5, the data length of the response is variable.

Figure 23:
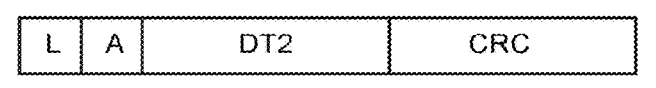

FIG. 23 illustrates an exemplary data format of a response according to embodiment 5. As illustrated in FIG. 23, the response according to embodiment 5 contains a data length L in addition to the items described in embodiment 2. In the data length L, a value indicating the data length of the response is stored. The data length of the data DT2 is variable and set at the data length determined by the data length determiner 207.

For example, when the instruction receiver 200 of the slave device S has received an individual instruction addressed to the slave device S, the data length determiner 207 executes the command contained in the individual instruction to activate or inactivate the plurality of interfaces IF of the slave device S. Then, the data length determiner 207 determines the data length of the response based on data size(s) correlated to an activated interface(s) IF. The data length determined by the data length determiner 207 is stored in the data length L of the response.

For example, when the interfaces IF1 and IF3 have been activated in the slave device S illustrated in FIG. 21, the data length determiner 207 determines the data length of the data DT2 of the response as a total of six bytes, which is a sum of two bytes correlated to the interface IF1 and four bytes correlated to the interface 1F3. When other interfaces IF than the interfaces IF1 and IF3 have been activated, the data length determiner 207 similarly determines the data length of the response based on a sum of the bytes correlated to the activate interfaces IF.

The response sender 204 of the slave device S sends the response having the data length determined by the data length determiner 207. Specifically, the response sender 204 sends the response with information obtained by the activated interfaces IF stored in the data DT2. This response may be a normal response to a general instruction.

The response of the response sender 204 of the slave device S has a transmission frame of a data length that is different from the data length of at least one other slave device S. The response sender 204 sends the response with rotational angle or associated information stored in the transmission frame. In other words, the responses of all the slave devices S have different data lengths. That is, the number of the slave devices S having the same data lengths is smaller than the total of the slave devices S connected to the lower-level communication path 90. In another possible embodiment, the responses of all the slave devices S may have mutually different data lengths. With the number of the slave devices S assumed as N, the number of the slave devices S having the same data lengths is smaller than N.

As described above, on the lower-level communication path 90, the interfaces IF of the slave devices S may be different from each other, and each interface IF may be correlated to different bytes. Additionally, which interface IF is activated may vary from slave device S to slave device S. That is, responses having different data lengths coexist on the lower-level communication path 90.

In embodiment 5, the transmission frame of the response that each slave device S sends has a data length that is determined based on the slave device S. This configuration eliminates or minimizes occurrence of the situation that the data length that occupies the response as a whole is greater than the actual data size. The above configuration also minimizes the data length of the transmission frame of the response. As a result, the communication traffic volume on the lower-level communication path 90 is minimized.

Also, the data length of the transmission frame depends on the interface IF of the slave device S from which the master device M1 needs to obtain information. This configuration minimizes the data length and improves the efficiency in minimizing the communication traffic volume. The above configuration also enables the master device M1 to specify necessary information.

While in embodiment 5 the slave device S includes a plurality of interfaces IF, the slave device S may not necessarily include the interfaces IF illustrated in FIG. 21. For example, the slave device S may have a plurality of kinds of output modes, and the data length may vary from output mode to output mode. Specifically, the data length determiner 207 may determine the data length of the response based on the data length correlated to the mode specified in the instruction.

6. Embodiment 6

A motor controller with a plurality of channels in the lower-level communication path performs processings based on information obtained from the plurality of channels. According to the inventors' knowledge and experience, if the channels have mutually different communication periods, for a processing on one channel to be performed, it is necessary to wait for the communication period of another channel to end, to the detriment of processing efficiency. As a result of studies conducted by the inventors in an attempt to improve processing efficiency in a motor controller with a plurality of channels in the lower-level communication path, the inventors conceived of a novel and unique motor control system and associated apparatuses and/or devices. A motor control system and associated apparatuses and/or devices according to embodiment 6 will be described in detail below.

In embodiment 6, the motor control system 1 includes a plurality of channels in the lower-level communication path 90. Through each of the channels, a plurality of slave devices S are connected in series to each other to perform a fixed-period communication. While the channels of the lower-level communication path 90 may have mutually different fixed-period communication periods, the channels have the same fixed-period communication periods in embodiment 6. Embodiment 6 may have a general arrangement similar to the general arrangement of embodiment 4 described in FIG. 16.

One processing that the master device M1 performs is to obtain associated information from a slave device S on one of a plurality of lower-level communication paths 90, and based on the associated information, to send an individual instruction to another slave device S on another lower-level communication path 90. For example, the instruction sender 100 of the master device M1 obtains pressure information from the pressure sensor of the slave device S14 on the lower-level communication path 90-1 illustrated in FIG. 16, and based on the pressure information, the instruction sender 100 sends an individual instruction to write setting information of the slave device S21 on the lower-level communication path 90-2. For further example, the instruction sender 100 of the master device M1 receives information from a slave device S on the lower-level communication path 90-1 or 90-2 of the robot R1, and based on the information, the instruction sender 100 sends an individual instruction to a slave device S on the lower-level communication path 90-3 or 90-4 of the robot R2. In this case, the lower-level communication paths 90 are synchronized; otherwise, processing efficiency might deteriorate.

Figure 24:
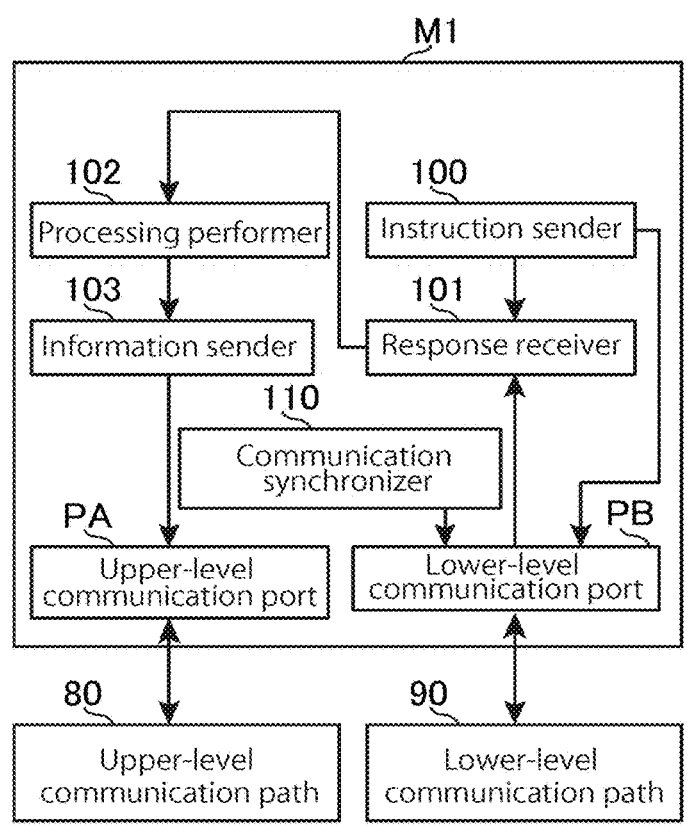
FIG. 24 is a functional block diagram of a master device according to embodiment 6.

FIG. 24 is a functional block diagram of the master device M1 according to embodiment 6. As illustrated in FIG. 24, the master device M1 further includes a communication synchronizer 110. The communication synchronizer 110 synchronizes the communication periods of the channels. For example, the communication synchronizer 110 makes the start timings of the communication periods of the channels match each other. Specifically, the communication synchronizer 110 sends a predetermined synchronization signal to the lower-level communication paths 90, thereby synchronizing the channels. Synchronizing the channels also matches the timings at which the master device M1 receives information from the slave devices S of the channels.

In embodiment 6, processings are performed with the communication periods of the channels synchronized. This configuration improves the efficiency of the master device M1 performing processings.

7. Embodiment 7

In an M-to-N communication, a master (monitor) device may dynamically assign an address to a control-target slave device. According to the inventors' knowledge and experience, when the monitor device dynamically assigns an address to the slave device after the slave device has been removed for maintenance or other reasons, the address might be assigned to some other slave device that is not the control target of the monitor device. As a result of studies conducted by the inventors in an attempt to reliably control a control target device, the inventors conceived of a novel and unique motor control system and associated apparatuses and/or devices. A motor control system and associated apparatuses and/or devices according to embodiment 7 will be described in detail below.

In embodiment 7, the form of communication of the motor control system 1 is the M-to-N communication illustrated in FIG. 11. The master device M1, at initialization timing, assigns addresses (IDs) to lower-level devices in ascending order of levels of the lower-level devices S. At the initialization timing, such as at the time of supply of electric power, the upper-level communication ports PA of the monitor devices M2 and M3 and the slave devices S are on; the lower-level communication ports PB of the monitor devices M2 and M3 and the slave devices S are off; the repeat functions of the monitor devices M2 and M3 and the slave devices S are off; and the lower-level communication port PB of the master device M1 is on.

In this case, after supply of electric power, the master device M1 is communicative with the monitor device M2 alone. For example, the master device M1 assigns the address "1" to the monitor device M2, with which the master device M1 is communicative. With this address assigned, the monitor device M2 turns its lower-level communication port PB on. With the lower-level communication port PB of the monitor device M2 on, the master device M1 is communicative with the monitor device M3. The master device M1 assigns the address "2" to the monitor device M3, with which the master device M1 is communicative. With this address assigned, the monitor device M3 turns its lower-level communication port PB on. Then, the master device M1 repeats this cycle of processings to assign addresses to the slave devices S in ascending order of levels of the slave devices S.

For example, assume that the slave devices S5 and S6 are removed for maintenance or other reasons, causing the lower-level communication port PB of the monitor device M3 to be connected to the upper-level communication port PA of the slave device S7 through the lower-level communication path 90. In this case, upon supply of electric power to the motor control system 1, the master device M1 assigns addresses to the lower-level devices S in ascending order of levels of the lower-level devices S. Specifically, the slave device S7 is assigned the address "3", which would be "5" if the slave devices S5 and S6 had not been removed; and the slave device S8 is assigned the address "4", which would be "6" if the slave devices S5 and S6 had not been removed. Since the addresses "3" and "4" are originally addresses for the slave devices S5 and S6, the monitor device M2 might mistake the slave devices S7 and S8 respectively as the slave devices S5 and S6, which correspond to the monitor device M2. In order to prevent the monitor device M2 from making this mistake, each slave device S stores identification information of the master device M1, the monitor device M2, or the monitor device M3 to which the slave device S corresponds.

Figure 25:
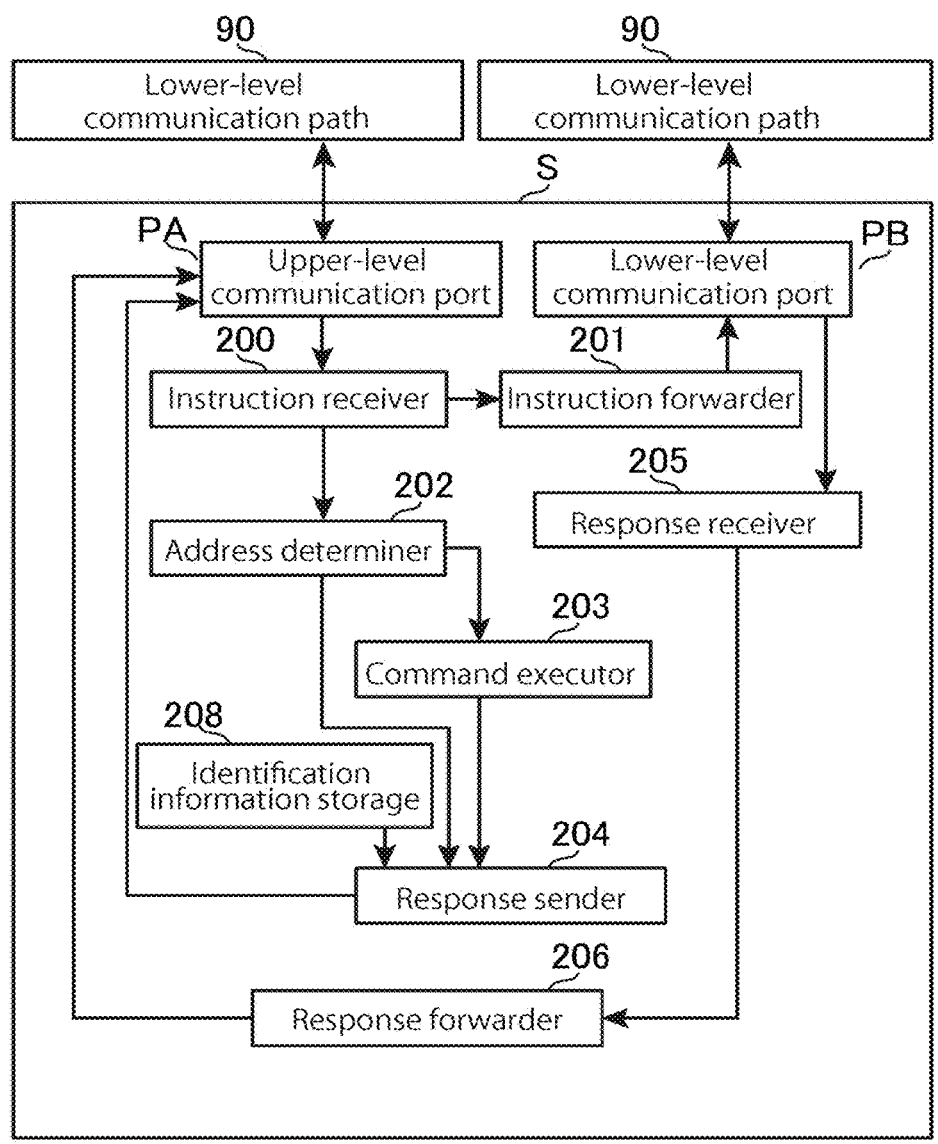
FIG. 25 is a functional block diagram of a slave device according to embodiment 7.

FIG. 25 is a functional block diagram of the slave device S according to embodiment 7. As illustrated in FIG. 25, the slave device S includes an identification information storage 208. The identification information storage 208 stores identification information to identify the master device M1, the monitor device M2, or the monitor device M3. For example, the identification information is a serial number of the master device M1, the monitor device M2, or the monitor device M3. The identification information may be other than a serial number insofar as the master device M1, the monitor device M2, or the monitor device M3 is uniquely identified.

For example, when the master device M1, the monitor device M2, and the monitor device M3 are assigned their own unique addresses, the addresses may be used as identification information. The identification information may be recorded in advance in the memory of the slave device S by a computer connected to the slave device S. The computer may be used mainly for maintenance purposes. The identification information storage 208 stores identification information, specified by the computer, of the master device M1, the monitor device M2, or the monitor device M3.

Figure 26:
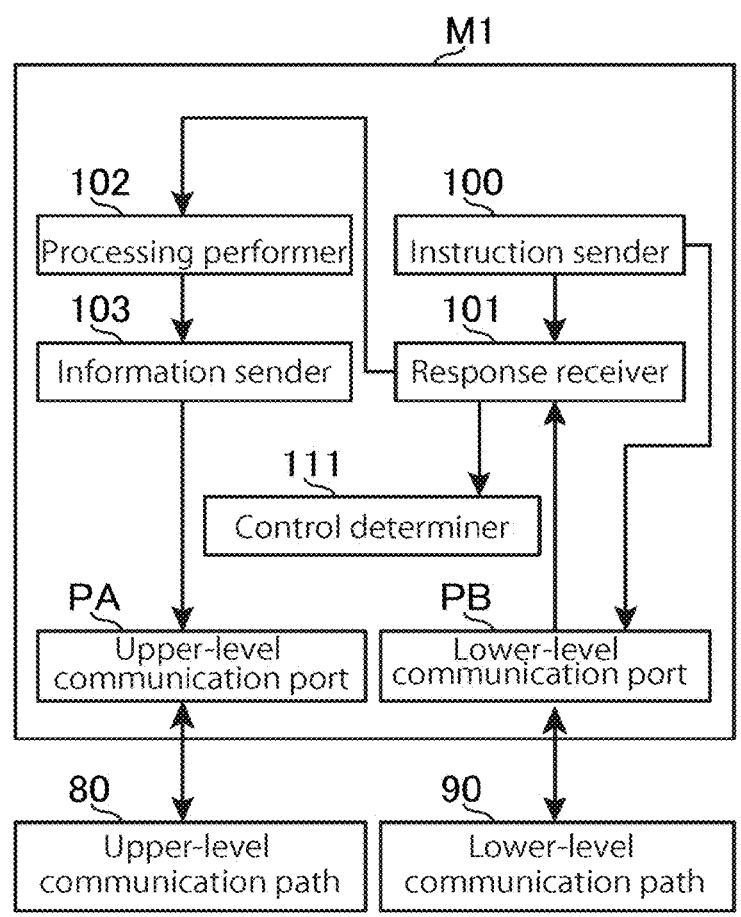
FIG. 26 is a functional block diagram of a master device according to embodiment 7.

FIG. 26 is a functional block diagram of the master device M1 according to embodiment 7. As illustrated in FIG. 26, the master device M1 includes a control determiner 111. Based on the identification information received through the lower-level communication path 90, the control determiner 111 determines whether to control a motor. Specifically, the control determiner 111 determines whether the identification information received through the lower-level communication path 90 is the identification information of the master device M1. When the control determiner 111 determines that the received identification information is not the identification information of the master device M1, the control determiner 111 determines not to control the control-target motor. When the control determiner 111 determines that the received identification information is the identification information of the master device M1, the control determiner 111 determines to control the control-target motor. The control determiner 111 may also be provided in the monitor devices M2 and M3.

In embodiment 7, the master device M1, the monitor device M2, or the monitor device M3 determines, based on identification information received from the slave device S, whether to control the control-target motor. This configuration enables the slave device S, the master device M1, the monitor device M2, or the monitor device M3 to reliably control the control-target motor. Even if one or some of the slave devices S are removed for maintenance or other reasons, the control-target motor is controlled by a correct combination of a motor controller and a slave device S.

The identification information storage 208 of each slave devices S may store the identification information of the slave devices S itself. In this case, each of the master device M1 and the monitor devices M2 and M3 stores in each device M's memory the identification information of the control-target slave device S of the device M. The control determiner 111 of the master device M1 determines whether the identification information received from the slave device S is the address of the master device M1.

8. Embodiment 8

In some motor controllers, the communication ports are classified in advance into an upper-level communication port and a lower-level communication port. According to the inventors' knowledge and experience, during maintenance of a motor controller, the lower-level communication path might be erroneously connected to the upper-level communication port, or the upper-level communication path might be erroneously connected to the lower-level communication port. As a result of studies conducted by the inventors in an attempt to make no classification of the communication ports, the inventors conceived of a novel and unique motor control system and associated apparatuses and/or devices. A motor control system and associated apparatuses and/or devices according to embodiment 8 will be described in detail below.

Figure 27:
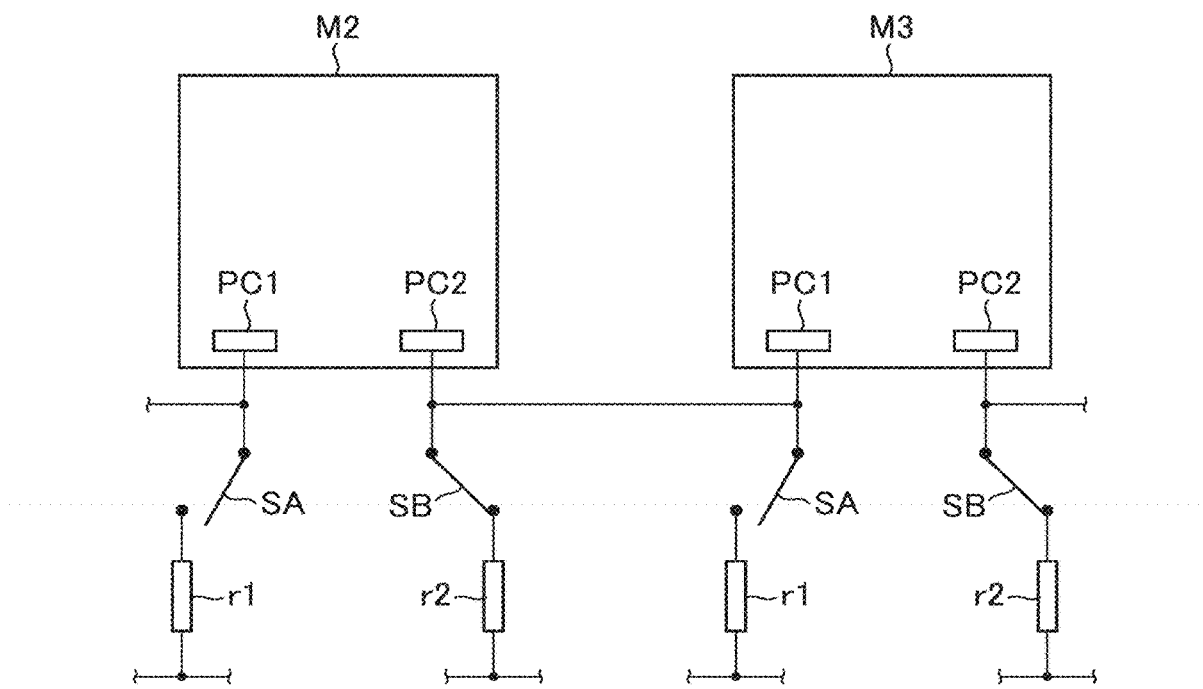
FIG. 27 illustrates a physical configuration of a monitor according to embodiment 8.

FIG. 27 is a diagram illustrating a physical configuration of a monitors M2 and M3 according to embodiment 8. As illustrated in FIG. 27, each of the monitor devices M2 and M3 includes switches SA and SB and elements r1 and r2. Each of the elements r1 and r2 has a predetermined resistance or impedance. In embodiment 8, the elements r1 and r2 are electrical resistors. Electrical resistors, however, are not intended in a limiting sense; any other elements are possible insofar as the elements reduce current flow. Other examples include, but are not limited to, coils, capacitors, and a combination of a coil and a capacitor. Each of the monitor devices M2 and M3 further includes communication ports PC1 and PC2. The communication ports PC1 and PC2 have similar physical configurations, and are neither classified into an upper-level communication port nor a lower-level communication port. The switch SA connects the element r1 to the lower-level communication path 90 connected to the communication port PC1. The switch SB connects the element r2 to the lower-level communication path 90 connected to the communication port PC2. In embodiment 8, the elements r1 and r2 are connected to lower-level communication ports. This configuration reduce noise on the lower-level communication path 90.

Figure 28:
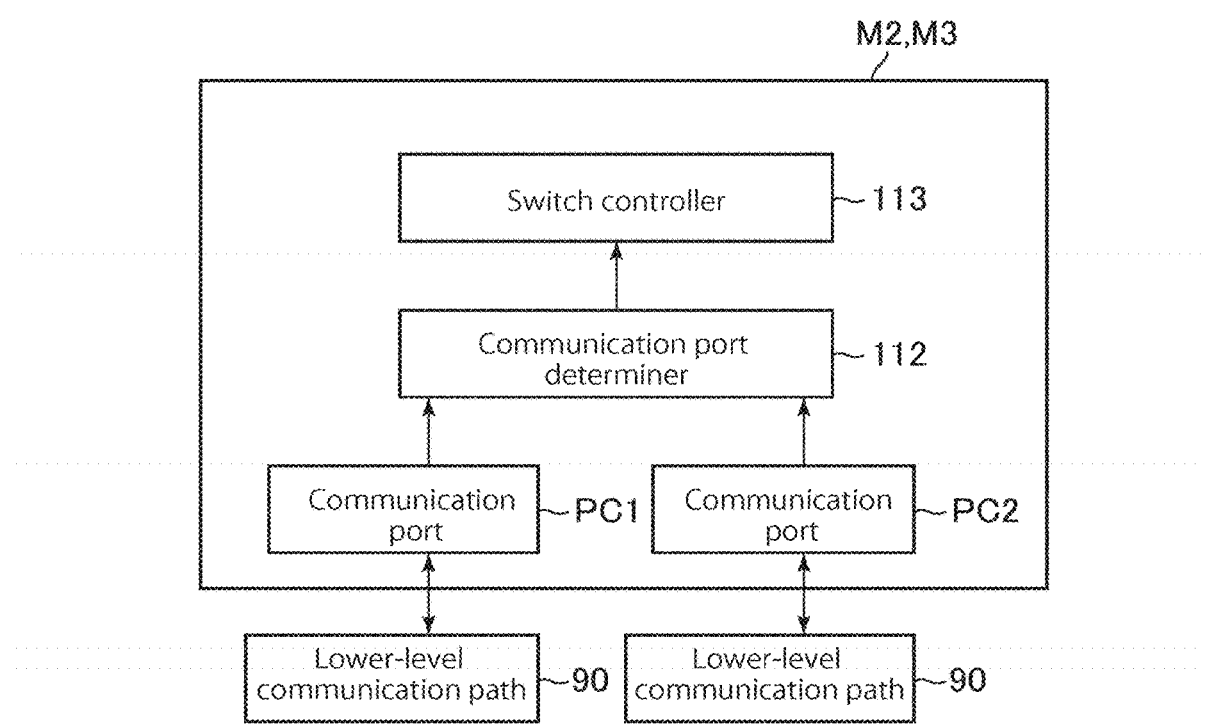
FIG. 28 is a functional block diagram of a monitor according to embodiment 8.

FIG. 28 is a functional block diagram of the monitors M2 and M3 according to embodiment 8. As illustrated in FIG. 28, in embodiment 8, each of the monitors M2 and M3 further includes a communication port determiner 112 and a switch controller 113. The communication port determiner 112 identifies a communication port, from among the plurality of communication ports, that has received an instruction sent from the master device M1. For example, the communication port determiner 112 identifies a communication port, from among the plurality of communication ports, that first received information.

Based on the determination made by the communication port determiner 112, the switch controller 113 selects a communication port, from among the plurality of communication ports, that is to be connected to the corresponding element r1 or r2. That is, one of the communication ports PC1 and PC2 is connected to the corresponding element r1 or r2. In embodiment 8, the lower-level communication port is connected to the corresponding element r1 or r2. For example, the switch controller 113 may cause the lower-level communication path 90 of the lower-level communication port, which has not received any instruction, to be connected to the corresponding element r1 or r2. For further example, the switch controller 113 may cause the lower-level communication path 90 of the upper-level communication port, which has received the instruction, to be connected to the corresponding element r1 or r2. Each of the slave devices S is connected to the element r1 or r2 on the upper-level side of the slave device S or on the lower-level side of the slave device S. Suppose that the example illustrated in FIG. 27 were such that the communication port PC2 of the monitor device M2 is connected to the element r2 while the communication port PC1 of the monitor device M3 is connected to the element r1. In this case, the monitor devices M2 and M3 are connected to each other through a lower-level communication path 90, and the element r2 of the monitor device M2 and the element r1 of the monitor device M3 are connected to each other through this lower-level communication path 90. This configuration might not be able to reduce noise on the lower-level communication path 90 sufficiently. In view of this situation, as illustrated in FIG. 27, the monitor devices M2 and M3 are coordinated to have the same sides, the upper-level sides or the lower-level sides, connected to the elements r1 or r2. This configuration improves efficiency in reducing noise.

Embodiment 8 eliminates the need for classifying the communication ports into an upper-level communication port and a lower-level communication port, and improves maintainability.

Modifications

In a possible modification, above-described embodiments 1 to 8 may be combined with each other.

In another possible modification, the motor controller 20 may include means for reducing a load associated with the upper-level controller 10 based on rotational angle or associated information obtained through the lower-level communication path 90. As used herein, the load encompasses a load associated with processing and a load associated with communication. For example, the motor controller 20 may be disposed between the upper-level controller 10 and the lower-level slave devices S to implement a function to analyze sensing data so as to reduce the communication traffic volume to the upper-level communication path 80 or reduce the processing load of the upper-level controller 10. In this case, not all the responses of the slave devices S are sent to the upper-level communication path 80, but one or some of the responses are sent to the upper-level communication path 80. This configuration enables the motor controller 20 to reduce the communication traffic volume between the motor controller 20 and the upper-level controller 10 and to perform processing that should otherwise be performed by the upper-level controller 10. As a result, the processing load of the upper-level controller 10 is minimized.

Obviously, numerous modifications and error of the present disclosure are possible in light of the above teachings. It is therefore to be understood that within the scope of the appended claims, the present disclosure may be practiced otherwise than as specifically described herein.

What is claimed:

1. A motor control system, comprising:
   first processing circuitry configured to control a motor;
   an upper-level communication path connecting an upper-level communication port of the first processing circuitry to second processing circuitry, the second processing circuitry being configured to send an instruction to the first processing circuitry via the upper-level communication path; and
   a lower-level communication path connecting a lower-level communication port of the first processing circuitry to a plurality of devices connected in series to each other,
   wherein the plurality of devices include rotational angle detection circuitry configured to detect a rotational angle of the motor, and output circuitry configured to output a first piece of associated information and a second piece of associated information, the first piece of associated information being associated with the motor and being different from the rotational angle of the motor, the second piece of associated information being associated with an industrial device associated with the motor, and the first processing circuitry is further configured to perform predetermined processing based on the rotational angle and the at least one piece of associated information received via the lower-level communication path, and send a result of the predetermined processing to the second processing circuitry via the upper-level communication path.

2. The motor control system according to claim 1, wherein the first processing circuitry is configured to communicate with the second processing circuitry using a first communication protocol and via the upper-level communication path, and is configured to communicate with the rotational angle detection circuitry and the output device using a second communication protocol different from the first communication protocol and through the lower-level communication path.

3. The motor control system according to claim 1, wherein the first processing circuitry is configured to communicate with the second processing circuitry during a first communication period and via the upper-level communication path, and is configured to communicate with the rotational angle detection circuitry and the output device during a second communication period different from the first communication period and via the lower-level communication path.

4. The motor control system according to claim 1, wherein the first processing circuitry is further configured to send a general instruction to each of the plurality of devices from the lower-level communication port in order to communicate with each of the plurality of devices, each device of the plurality of devices comprises third processing circuitry configured to, in response to the general instruction, send a response comprising at least one of the rotational angle and the at least one piece of associated information, and the first processing circuitry is further configured to send an individual instruction to one device among the plurality of devices via the lower-level communication port in order to communicate with the one device and control operation of the one device.

5. The motor control system according to claim 4, wherein the individual instruction includes setting information for the one device, and the third processing circuitry is further configured to, in response to the individual instruction, record the setting information in a memory of a respective device of the plurality of devices.

6. The motor control system according to claim 4, wherein when the individual instruction is addressed to another device, among the plurality of devices, that is other than the one device, the third processing circuitry of the one device is further configured to send the response comprising at least one of the rotational angle and the at least one piece of associated information on behalf of the another device.

7. The motor control system according to claim 4, wherein the individual instruction includes a control command that controls operation of the one device, and the third processing circuitry is further configured to execute the control command when the individual instruction is addressed to the one device.

8. The motor control system according to claim 1, wherein the first processing circuitry includes a plurality of motor control processing circuits, the rotational angle detection circuitry of the plurality of devices comprises a plurality of rotational angle detection circuits respectively corresponding to the plurality of motor control processing circuits, the upper-level communication path is connected to the upper-level communication port of an uppermost-level motor control processing circuit among the plurality of motor control processing circuits, the lower-level communication path is connected to the lower-level communication port of the uppermost-level motor control processing circuit, and is configured to connect a lower-level motor control processing circuit, among the plurality of motor control processing circuits, in series to the plurality of devices, and each motor control processing circuit of the plurality of motor control processing circuits is configured to perform the predetermined processing at least based on the rotational angle received from a device, among the plurality of devices, that corresponds to the each motor control processing circuit.

9. The motor control system according to claim 8, wherein the uppermost-level motor control processing circuit is configured to send, via the lower-level communication port to the lower-level motor control processing circuit, an inquiry as to a necessity of an instruction, the lower-level motor control processing circuit is configured to send an answer to the inquiry received via the lower-level communication path, and based on the answer received via the lower-level communication path, the uppermost-level motor control processing circuit is configured to send, on behalf of the lower-level motor control processing circuit, the instruction from the lower-level communication port to a device, among the plurality of devices, that corresponds to the lower-level motor control processing circuit.

10. The motor control system according to claim 1, wherein each device of the plurality of devices includes third processing circuitry configured to send at least one of the rotational angle and the at least one piece of associated information in a period different from a period in which another third processing circuitry of at least one other device among the plurality of devices sends at least one of the rotational angle and the at least one piece of associated information.

11. The motor control system according to claim 10, wherein the third processing circuitry of the each device is configured to send at least one of the rotational angle and the at least one piece of associated information at a sending timing determined based on a sending timing of the another third processing circuitry of the at least one other device.

12. The motor control system according to claim 1, wherein each device of the plurality of devices comprises third processing circuitry configured to instruct storage of at least one of the rotational angle and the at least one piece of associated information in a transmission frame of a data length different from a data length of another transmission frame for at least one other device among the plurality of devices, and configured to send at least one of the rotational angle and the at least one piece of associated information in the transmission frame.

13. The motor control system according to claim 12, wherein each device of the plurality of devices comprises a plurality of interfaces each connected to a sensor to detect at least one of the rotational angle and the at least one piece of associated information, the first processing circuitry is further configured to send, via the lower-level communication port, an instruction to identify an interface, among the plurality of interfaces, from which the each device of the plurality of devices outputs information, and the third processing circuitry of each device of the plurality of devices is configured to determine a data length of a response made by the each device based on the interface identified by the instruction received via the lower-level communication path.

14. The motor control system according to claim 8, wherein the lower-level motor control processing circuit controls a plurality of communication ports and is configured to determine a communication port, among the plurality of communication ports, that has received an instruction sent from the uppermost-level motor control processing circuit, and select, based on the determination of the communication port that received the instruction, a communication port, from among the plurality of communication ports, that is to be connected to an element comprising at least one of a predetermined resistance and a predetermined impedance.

15. The motor control system according to claim 2, wherein the first processing circuitry is configured to communicate with the second processing circuitry during a first communication period and via the upper-level communication path, and is configured to communicate with the rotational angle detection circuitry and the output device during a second communication period different from the first communication period and via the lower-level communication path.

16. A robot system, comprising:
a motor control system comprising first processing circuitry configured to control a motor, an upper-level communication path connecting an upper-level communication port of the first processing circuitry to second processing circuitry, the second processing circuitry being configured to send an instruction to the first processing circuitry via the upper-level communication path, and a lower-level communication path connecting a lower-level communication port of the first processing circuitry to a plurality of devices connected in series to each other,
wherein the plurality of devices include rotational angle detection circuitry configured to detect a rotational angle of the motor, and output circuitry configured to output a first piece of associated information and a second piece of associated information, the first piece of associated information being associated with the motor and being different from the rotational angle of the motor, the second piece of associated information being associated with an industrial device associated with the motor, and the first processing circuitry is further configured to perform predetermined processing based on the rotational angle and the at least one piece of associated information received via the lower-level communication path, and send a result of the predetermined processing to the second processing circuitry via the upper-level communication path; and
a robot.

17. A communication method for a motor control system, comprising:
implementing, via an upper-level communication path, communication between an upper-level communication port of first processing circuitry that is configured to control a motor and second processing circuitry that is configured to send an instruction to the first processing circuitry via the upper-level communication path;
implementing, via a lower-level communication path connecting a plurality of devices in series to each other, communication between the plurality of devices, the plurality of devices including rotational angle detection circuitry connected to a lower-level communication port and configured to detect a rotational angle of the motor, and output circuitry configured to output a first piece of associated information and a second piece of associated information, the first piece of associated information being associated with the motor and being different from the rotational angle of the motor, the second piece of associated information being associated with an industrial device associated with the motor; and
causing the first processing circuitry to perform a predetermined processing based on the rotational angle and the at least one piece of associated information received via the lower-level communication path and to send a result of the predetermined processing to the second processing circuitry via the upper-level communication path.

18. A motor control system, comprising:

first processing circuitry configured to control a motor;

an upper-level communication path connecting the first processing circuitry to second processing circuitry, the second processing circuitry being configured to send an instruction to the first processing circuitry via the upper-level communication path; and a lower-level communication path connecting a lower-level communication port of the first processing circuitry to a plurality of devices connected in series to each other, wherein the plurality of devices include rotational angle detection circuitry configured to detect a rotational angle of the motor, and output circuitry configured to output a first piece of associated information and a second piece of associated information, the first piece of associated information being associated with the motor and being different from the rotational angle of the motor, the second piece of associated information being associated with an industrial device associated with the motor, and the first processing circuitry is further configured to reduce a load associated with the second processing circuitry based on the rotational angle and the at least one piece of associated information obtained via the lower-level communication path.

19. The motor control system according to claim 1, wherein the lower-level communication path includes a plurality of channels each connecting the plurality of devices in series to each other to perform fixed-period communication, and the first processing circuitry is further configured to synchronize periods of the plurality of channels.

20. The motor control system according to claim 1, wherein each device of the plurality of devices includes an identification information storage configured to store identification information that identifies the respective device, and the first processing circuitry is further configured to determine, based on the identification information received via the lower-level communication path, whether to control the motor.

* * * * *